(12) United States Patent
Alqasimi et al.

(10) Patent No.: US 10,006,196 B1
(45) Date of Patent: Jun. 26, 2018

(54) SHAPE-MORPHING SPACE FRAME APPARATUS USING LINEAR BISTABLE ELEMENTS

(71) Applicants: Ahmad Alqasimi, Tampa, FL (US); Craig Lusk, Lutz, FL (US)

(72) Inventors: Ahmad Alqasimi, Tampa, FL (US); Craig Lusk, Lutz, FL (US)

(73) Assignee: University of South Florida, Tampa, FL (US)

( * ) Notice: Subject to any disclaimer, the term of this patent is extended or adjusted under 35 U.S.C. 154(b) by 0 days. days.

(21) Appl. No.: 15/691,110

(22) Filed: Aug. 30, 2017

Related U.S. Application Data

(62) Division of application No. 15/224,995, filed on Aug. 1, 2016, now Pat. No. 9,783,978.

(60) Provisional application No. 62/199,656, filed on Jul. 31, 2015.

(51) Int. Cl.
  *E04B 1/34* (2006.01)
  *E04B 1/344* (2006.01)
  *E04B 1/343* (2006.01)
  *E04B 1/19* (2006.01)

(52) U.S. Cl.
  CPC .......... *E04B 1/3441* (2013.01); *E04B 1/1903* (2013.01); *E04B 1/34384* (2013.01); *E04B 2001/1942* (2013.01); *E04B 2001/1957* (2013.01)

(58) Field of Classification Search
  CPC ...... E04B 1/32; E04B 1/3441; E04B 1/34384; E04B 1/02; E04B 1/09; D04H 13/00; D04H 3/04
  USPC .................................................. 52/633, 646
  See application file for complete search history.

(56) References Cited

U.S. PATENT DOCUMENTS

| | | | | |
|---|---|---|---|---|
| 4,772,894 A | * | 9/1988 | Foissac | E04B 1/34384 343/874 |
| 7,125,015 B2 | * | 10/2006 | Hoberman | A63F 9/0869 273/153 S |
| 7,540,215 B2 | * | 6/2009 | Hoberman | E04B 1/3441 428/12 |
| 7,699,212 B2 | * | 4/2010 | Turvey | B65D 1/225 206/508 |
| 8,789,317 B2 | * | 7/2014 | Cheh | E04B 1/32 29/428 |

(Continued)

*Primary Examiner* — Paola Agudelo
(74) *Attorney, Agent, or Firm* — Nilay J. Choksi; Smith & Hopen, P.A.

(57) ABSTRACT

A shape-morphing space frame (SMSF) utilizing the linear bistable compliant crank-slider mechanism (LBCCSM). The frame's initial shape is constructed from a single-layer grid of flexures, rigid links and LBCCSMs. The grid is bent into the space frame's initial cylindrical shape, which can morph because of the inclusion of LBCCSMs in its structure. The design parameters include the frame's initial height, its tessellation pattern (including the unit cell bistable elements' placement), its initial diameter, and the resulting desired shape. The method used in placing the unit cell bistable elements considers the principle stress trajectories. Two different examples of shape-morphing space frames are presented herein, each starting from a cylindrical-shell space frame and morphing, one to a hyperbolic-shell space frame and the other to a spherical-shell space frame, both morphing by applying moments, which shear the cylindrical shell, and forces, which change the cylinder's radius using Poisson's effect.

12 Claims, 20 Drawing Sheets

(56) References Cited

U.S. PATENT DOCUMENTS

| | | | |
|---|---|---|---|
| 2002/0083675 A1* | 7/2002 | Hoberman | A63F 9/088 52/645 |
| 2002/0112413 A1* | 8/2002 | Hoberman | E04B 1/3211 52/71 |
| 2008/0040984 A1* | 2/2008 | Lanahan | E02B 3/04 52/79.9 |
| 2016/0306160 A1* | 10/2016 | Adams | G02B 21/367 |

* cited by examiner

SHAPE-MORPHING SPACE FRAME APPARATUS USING LINEAR BISTABLE ELEMENTS

CROSS-REFERENCE TO RELATED APPLICATIONS

This nonprovisional application is a divisional of U.S. Nonprovisional patent application Ser. No. 15/224,995, entitled "Shape-Morphing Space Frame Apparatus Using Linear Bistable Elements", filed on Aug. 1, 2016 by the same inventors, which claims priority to U.S. Provisional Patent Application No. 62/199,656, entitled "Shape-Morphing Space Frame (SMSF) Using Linear Bi-Stable Elements", filed on Jul. 31, 2015 by the same inventors, both of which are incorporated herein by reference in their entireties.

FEDERALLY SPONSORED RESEARCH OR DEVELOPMENT

This invention was made with Government support under Grant No. CMMI-1053956 awarded by the National Science Foundation. The government has certain rights in the invention.

BACKGROUND OF THE INVENTION

1. Field of the Invention

This invention relates, generally, to space frames. More specifically, it relates to space frames that have the ability to controllably and stably morph between at least two (2) shapes or sizes.

2. Brief Description of the Prior Art

A compliant mechanism is a flexible mechanism that derives some or all its motion (mobility) from the deflection of flexible segments, thereby replacing the need for mechanical joints. It transfers an input force or displacement from one point to another through elastic body deformation. The absence or reduction of mechanical joints impacts both performance and cost. Advantages include reduced friction and wear, increased reliability and precision, and decreased maintenance and weight. Moreover, cost is also affected by reduced assembly time and, in most cases, due to its hingeless design, the fabrication of such mechanisms can be produced from a single piece. Additionally, compliant mechanisms provide the designer with an effective way to achieve mechanical stability.

A compliant bistable mechanism achieves its stability within the designed range of motion, by storing and releasing strain energy in its compliant segments. Such a technique enables the mechanism to stay at its two stable positions without the need of an external power/force to stay there. Energy methods, combined with pseudo-rigid-body models, can be used to analyze such compliant mechanisms.

These mechanisms are most commonly designed in two ways. One is using pseudo-rigid-body models, and the other is using topology optimization. Both approaches have utility. The design of the compliant portion of the unit cell components is accomplished through compliant mechanism synthesis.

There are three major approaches to the design and synthesis of compliant mechanisms: kinematic approximation methods, computationally intense methods, and linear and higher-order expansions of the governing equations. This disclosure is based primarily upon kinematic approximation methods.

The kinematic approximation or Pseudo-Rigid-Body Model (PRBM) approach works by identifying similarities between compliant mechanisms and rigid-body mechanisms. It has proved effective in identifying numerous compliant analogues to ubiquitous planar rigid-body mechanisms such as four-bar and crank-slider mechanisms. The chief criticisms of this approach are that the models are approximate and have limited, albeit known, accuracy. Moreover, the identification between flexure geometries and rigid-body mechanisms has been limited to a small but versatile set of planar configurations.

Computationally intense approaches typically combine finite element analysis with optimization to calculate optimal geometries in response to load and motion specifications. This approach has been successful, but has also been criticized for producing results identical to those produced more quickly by the PRBM approach, or results that are not physically realizable. As a general rule, this approach is more capable and accurate than the PRBM approach, but also more time consuming.

The third approach, which relies on linear and higher-order expansions of the governing equations, is well-known in precision mechanisms research, and relies heavily on flexures that are small and undergo small, nearly linear, deflections. This approach uses flexures much smaller than the overall mechanism size, so it is not generally applicable to millimeter-scale and smaller mechanisms. These techniques are important but do not have a direct bearing on the invention disclosed herein.

Systems for subdividing surfaces in the development of finite element algorithms using node definition and degrees of freedom are known. These same subdivisions schemes are applicable to the design of the novel shape-shifting surfaces disclosed hereinafter. The prior art includes techniques for node placement in a given shape. For example, in Finite Element models, the behavior between nodes is typically determined by interpolating functions. In the multi-stable shape-shifting system disclosed hereinafter, a kinematic scheme is required to fill the gaps between nodes. Thus, kinematic skeletons are developed which have the same number of nodes (typically revolute joints) and the same number of degrees of freedom. Methods for enumerating all possible kinematic linkages with a given number of degrees of freedom are known. The simplest systems satisfying degree of freedom requirements are preferred. For example, triangular elements with additional nodes along the edges and center-point nodes are known.

Tiling systems, periodic and aperiodic, are methods for subdividing surfaces and as such have been extensively studied by mathematicians and artists since antiquity. The three regular tilings are: 1) equilateral triangles only, 2) squares only, and 3) regular hexagons only. There are eight Archimedian tilings, and there are aperiodic Penrose kite-and-dart tiling systems. The regular tilings are simple and require the fewest different types of unit cells. Some of the Archimedian tilings use polygons with several sides, yielding generous angles and areas to work with, which may be advantageous. Penrose tiles are specifically shaped quadrilaterals that can be assembled in multiple, non-periodic ways.

In 1827, Carl Fredrich Gauss published his 'Theorema Egregium' which is the foundational result in differential geometry. The basic result is that small triangles do not change their shape when bent and that there is a fundamental difference in the shape of triangles that are planar (the sum of the angles is equal to 180 degrees) and the shape of triangles on a sphere (the sum of the angles is always more than 180 degrees) and the shape of triangles on a hyperbolic or saddle-shaped surface (the sum of the angles is always less than 180 degrees). His result means that spheres cannot be made into planes without crumpling or tearing or stretching (distorting) the surface. This fundamental geometric limitation makes the building of certain types of curved surfaces (those with two non-zero principal curvatures) intrinsically more difficult than working with planar surfaces (both principal curvatures equal to zero) or developable surfaces (one principal curvature equal to zero).

A surface is defined as a material layer constituting such a boundary. Examples of this are walls, ceilings, doors, tables, armor, vehicle bodies, etc. However, in some cases, it may be valuable for these surfaces to change shape while still maintaining rigidity in the direction normal to the surface. In addition, having surfaces able to change between two different sizes on demand and stabilize in those sizes may be of even more value. One valuable application of size changing surfaces may be rigid containers, for example milk crates, trash barrels, dumpsters, laundry baskets, suit cases, truck beds, freight trains, trash compactors, etc. Such containers are designed for large volumes, however, when not in use, may become cumbersome. Thus, containers with large volumes when in use and small volumes when empty are of value. This includes the ability for containers to maintain large or small sizes both when in use and when empty.

This leads to a need for innovation that allows conventional surfaces to achieve new functionality, to be constructed more precisely, or at lower cost. More particularly, a low-cost modular building system with customizable degrees-of-freedom and stiffness with stability in multiple positions is needed. In addition to potential savings when a new barrier is erected, an innovative system would provide new methods and functionality to surfaces and objects.

Objects that function as physical barriers or supporting surfaces include walls, table tops, shelves, floors, ceilings, stairs, vehicle bodies, and pipelines. Conventional methods for constructing these barriers can be costly, but even when they are inexpensive, the numbers of these kinds of objects mean that they represent a significant economic investment. Such barriers often incur additional costs when they require modification or removal. Thus there is a need for a surface, and a method for designing such surface, having a shape that may be modified or adjusted without damaging the surface or rebuilding it, and that has stability in multiple positions or shapes.

Space-frames are widely used in structures (e.g., roof structure) with complex geometries that involve heavy computations and optimization using genetic algorithm [Kociecki, M., Adeli, H., "Shape optimization of freeform steel space-frame roof structures with complex geometries using evolutionary computing" Engineering Application of Artificial Intelligence, Volume 38, February 2015, Pages 168-182]. However, there is no current ability to provide bistability to space-frames in a predictable and controllable manner.

Accordingly, what is needed is an improved structure and methodology for providing predictable and controllable space-frame change (e.g., used in shape-shifting surfaces), allowing the morphing of one specific shape into a different specific shape. However, in view of the art considered as a whole at the time the present invention was made, it was not obvious to those of ordinary skill in the field of this invention how the shortcomings of the prior art could be overcome.

While certain aspects of conventional technologies have been discussed to facilitate disclosure of the invention, Applicants in no way disclaim these technical aspects, and it is contemplated that the claimed invention may encompass one or more of the conventional technical aspects discussed herein.

The present invention may address one or more of the problems and deficiencies of the prior art discussed above. However, it is contemplated that the invention may prove useful in addressing other problems and deficiencies in a number of technical areas. Therefore, the claimed invention should not necessarily be construed as limited to addressing any of the particular problems or deficiencies discussed herein.

In this specification, where a document, act or item of knowledge is referred to or discussed, this reference or discussion is not an admission that the document, act or item of knowledge or any combination thereof was at the priority date, publicly available, known to the public, part of common general knowledge, or otherwise constitutes prior art under the applicable statutory provisions; or is known to be relevant to an attempt to solve any problem with which this specification is concerned.

BRIEF SUMMARY OF THE INVENTION

The long-standing but heretofore unfulfilled need for an improved multi-stable space frame and associated mechanism is now met by a new, useful, and nonobvious invention.

It is an object of the current invention to provide a developable surface composed of single-layer grid of flexures and linear bistable compliant crank-slider-mechanisms that—if arranged in certain tessellation patterns—would transform a 2D developable surface design into a variable 3D space-frame. Also, the ability to change the surface profile upon actuation can be implemented in various applications such as deployable antennas, airplane wings' morphing, and fluid flow controller. Moreover, if the SMSF were able to be manufactured at the micro-scale, it could be used in medical applications, such as an intravascular stent.

In an embodiment, the current version is a unit cell using bistable elements for morphing space-frames between shapes. The unit cell has an open stable position and a closed stable position. It includes a first, second, third, fourth, fifth, and sixth segment, each having a first end and a second end. A living hinge couples the second end of the first segment to the first end of the second segment and the first end of the fourth segment. Another living hinge connects the second end of the second segment to the first end of the third segment. Yet another living hinge connects the second end of the fourth segment to the first end of the fifth segment. The second end of the third and fifth segments come together to connect with the first end of the sixth segment.

In the open stable position, the angle formed by the intersection between the second and fourth segments is less than or equal to about 90°, the angle formed by the intersection between that second and third segments is greater than or equal to about 90°, the angle formed by the intersection between the fourth and fifth segments is greater than or equal to about 90°, and the angle formed by the intersection between the third and fifth segments is less than or equal to about 90°.

In the closed stable position, the angle formed by the intersection between the second and fourth segments is greater than or equal to about 180°, the angle formed by the intersection between that second and third segments is less than or equal to about 45°, the angle formed by the intersection between the fourth and fifth segments is less than or equal to about 45°, and the angle formed by the intersection between the third and fifth segments is less than or equal to about 90°.

In another embodiment, the current version is a shape-morphing space frame apparatus using unit cell bistable elements. The invention uses a plurality of unit cells, substantially as described previously, and rigid links. The unit cells and rigid links are positioned in diagonal, radial and vertical positions, combining to form a tessellation pattern.

The space frame apparatus is first formed as a single layer grid and subsequently bent into its initial shape. This initial shape has a first end and a second end which are held in static position when forces are applied to transform the space frame apparatus between the initial shape and the resulting shape. The forces that are applied are a plurality of radial, axial and diagonal forces. The space frame apparatus has the ability to morph from the initial shape to the resulting shape when the forces are applied. The unit cells are in the open stable position or the closed stable position while the space frame is in the initial shape and move to the opposite stable position when the space frame is in the resulting shape.

The shape-morphing space frame apparatus may include a plurality of the space frame apparatuses attached together.

The shape-morphing space frame apparatus's initial shape may be a cylinder, with the resulting shape being a hyperbolic shell or a spherical shell. The shape-morphing space frame may achieve the bistability without the use of a hard stop. The tessellation pattern of the shape-morphing space frame may be made of square or polygon sub-grids. Also, the square or polygon sub-grids may be made of unit cells and rigid links.

In a separate embodiment, the current invention is a method of producing predictable and controllable length changes in a space frame. The method includes morphing from an initial shape into a resulting specific shape without the use of a hard stop.

The method includes identifying the initial shape and the resulting shape. Each of the shapes have a first end and a second end. A plurality of elements, including unit cells and rigid links, are chosen to make up polygons with a total of five elements each (four side elements and a diagonal element, the four sides being two vertical elements and two horizontal elements). The polygons are then interconnected to form a tessellation pattern which in turn makes up the initial shape. The number and location of the unit cells in each of the polygons are chosen. The initial height of the initial shape is chosen, then the initial height of the initial shape is divided into a chosen number of slices. The height of the slices is equal to the length of the horizontal elements. The initial radius of the initial shape is then inputted, along with the change in radius at the midpoint of the resulting shape, and the relative motion of the first and second end of the initial shape. The maximum actuation force needed for transition between the initial shape and the resulting shape is calculated. The final step is fabricating the shape-morphing space frame based on the foregoing steps.

The method of producing predictable and controllable length changes in a space frame may have unit cells in an open or closed position. When placed in the diagonal direction, the unit cells may become shorter when morphing from the open position to the closed position and longer when morphing from the closed position to the open position. When placed in the radial direction, the unit cells may become necked when morphing from the open position to the closed position and bulging when morphing from the closed position to the open position.

Furthermore, the method may include a top and a bottom formed of rigid links. The method may also include making the vertical elements of the polygon rigid links.

These and other important objects, advantages, and features of the invention will become clear as this disclosure proceeds.

The invention accordingly comprises the features of construction, combination of elements, and arrangement of parts that will be exemplified in the disclosure set forth hereinafter and the scope of the invention will be indicated in the claims.

BRIEF DESCRIPTION OF THE DRAWINGS

For a fuller understanding of the invention, reference should be made to the following detailed description, taken in connection with the accompanying drawings, in which.

DETAILED DESCRIPTION OF THE PREFERRED EMBODIMENT

Figure 1A:
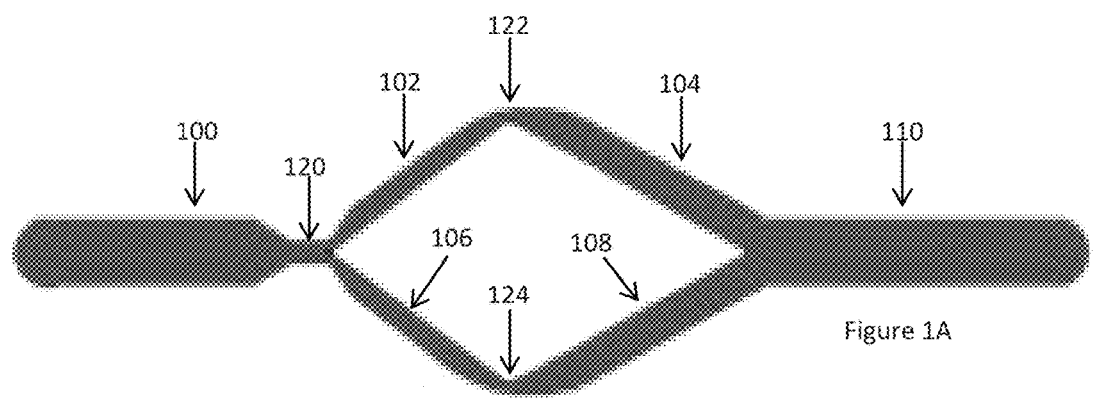
FIG. 1A depicts LBCCSM elements in an open position. normally open (A), and normally closed [Alqasimi, A., Lusk, C., Chimento, J., "Design of a Linear Bistable Compliant Crank-Slider-Mechanism (LBCCSM)" in Proceedings of the 2014 Design Engineering Technical Conferences & Computers and Information in Engineering Conference, Buffalo, N.Y., Aug. 17-20, 2014. DETC2014-34285].

In the following detailed description of the preferred embodiments, reference is made to the accompanying drawings, which form a part thereof, and within which are shown by way of illustration specific embodiments by which the invention may be practiced. It is to be understood that other embodiments may be utilized and structural changes may be made without departing from the scope of the invention.

As used in this specification and the appended claims, the singular forms "a", "an", and "the" include plural referents unless the content clearly dictates otherwise. As used in this specification and the appended claims, the term "or" is generally employed in its sense including "and/or" unless the context clearly dictates otherwise.

In an embodiment, the current invention is a shape-morphing space frame using linear bistable elements that can be customized based on the desired design. Generally, the mechanism described herein allows production of predictable and controllable length changes in space frames, allowing the morphing a space frame from an initial specific shape to a resulting specific shape (different from the initial shape), and vice versa. Common applications for space frames include, but are not limited to, roofs, motor vehicles, and bicycles.

A bistable compliant mechanism is a mechanism that derives its mobility from the deflection of flexible segments that would produce two stable positions. The advantages achieved from using the compliant mechanism can positively impact the performance, precision, and low maintenance if it was used as a single attachment in a structure. Moreover, the bistability can be achieved by storing and releasing strain energy in its compliant segments within the designed range of motion. Such an example of a bistable mechanism is the linear bistable compliant crank-slider-mechanism (LBCCSM), shown in FIG. 1, that can produce predictable and controllable length change in mechanical systems, allowing the morphing of its length from one specific length into a different specific length [Alqasimi, A., Lusk, C., Chimento, J., "Design of a Linear Bistable Compliant Crank-Slider-Mechanism (LBCCSM)" in Proceedings of the 2014 Design Engineering Technical Conferences & Computers and Information in Engineering Conference, Buffalo, N.Y., Aug. 17-20, 2014. DETC2014-34285]. The pseudo-rigid-body model (PRBM) was the approach used to design the LBCCSM elements.

Discussed herein are a mechanism and design examples that utilize the LBCCSM elements to morph a space-frame from its initial shape to its resulting desired shape. Placement of each element can be important to a particular design, and so each element's placement can be dependent on the designer's choice of the specific shape-morphing space frame (SMSF), though the ultimate goal is to produce predictable and controllable space-frame change, allowing the morphing of one specific shape into a different specific shape. This type of design can be used in the shape-shifting surfaces (SSSs) [Lusk, C. and Montalbano, P., 2011, "Design Concepts for Shape-Shifting Surfaces" in Proceedings of the 2011 Design Engineering Technical Conferences & Computers and Information in Engineering Conference, Washington, D.C., Aug. 29-31, 2011. DETC2011-47402] as an attachment to the SMSF, providing surface coverage to the space frame.

In an embodiment, the current invention provides a developable surface composed of single-layer grid of flexures and LBCCSMs that—if arranged in a certain tessellation pattern—can transform a two-dimensional (2D) developable surface design into a variable three-dimensional (3D) space-frame. The ability to change the surface profile upon actuation can be implemented in a wide range of applications, for example including, but not limited to, deployable antennas, airplane wings' morphing, and fluid flow controller. Moreover, if the SMSF was manufactured at a micro-scale, it can potentially be used in medical applications, for example an intravascular stent. Thus, it can be seen that specifying the initial and final shapes of the space frame is desirable, depending on the application.

Figure 2:
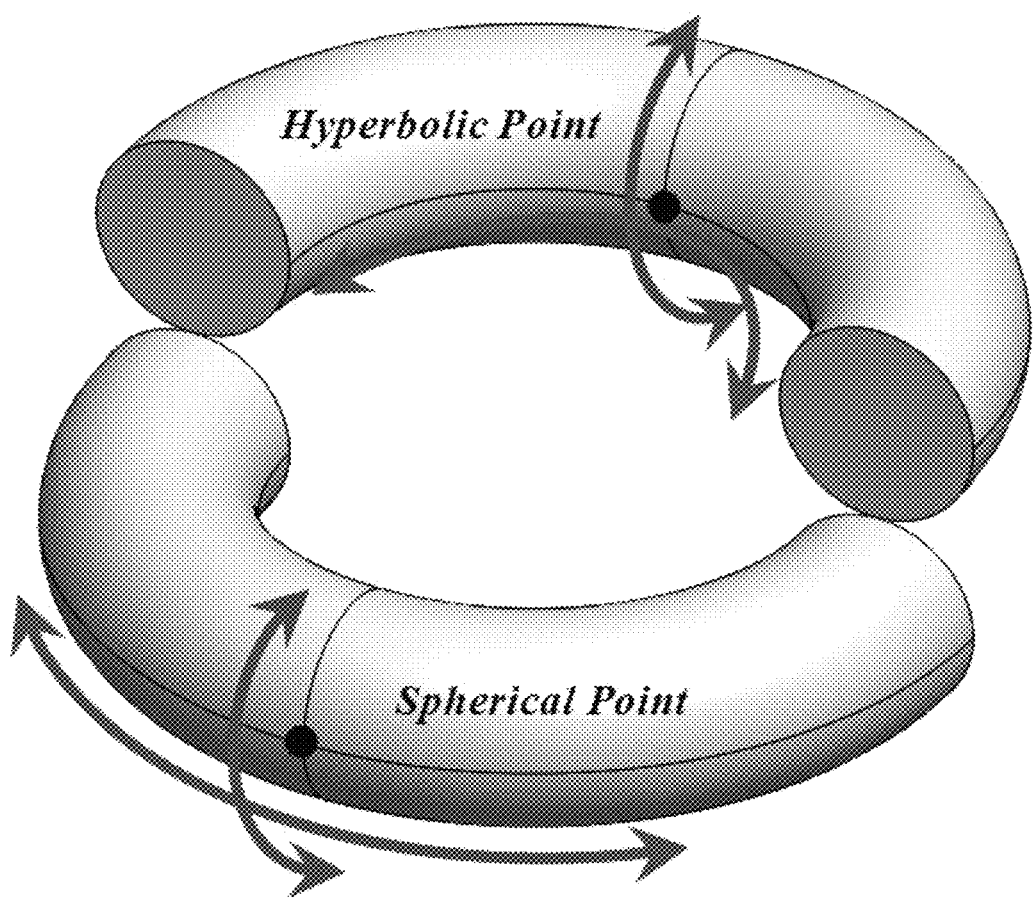
FIG. 2 depicts hyperbolic and spherical point on torus geometry.

As it relates to the certain embodiments of the current invention, one issue to consider is the Poisson effect from the classical mechanics of material theorem. This phenomenon describes the change in geometry under the applied load; a positive Poisson would be a negative ratio of axial to transverse strain (cylinder under tension would elongate and decrease its radius), and a negative Poisson would be a positive ratio of axial to transverse strain [Schodek, D., Structures, Prentice-Hall, New Jersey, 1980]. With this in mind, certain embodiments of the current invention also take the advantages of the torus geometry to describe vertices within a space-frame. When the product of the principle curvature at a vertex is negative, that vertex is on a hyperbolic profile, whereas a positive product indicates a spherical profile (see FIG. 2).

Figure 1B:
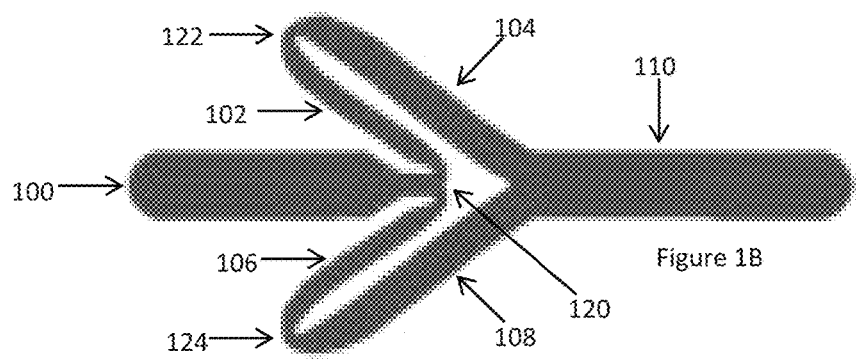
FIG. 1B depicts LBCCSM elements in a closed position [Alqasimi, A., Lusk, C., Chimento, J., "Design of a Linear Bistable Compliant Crank-Slider-Mechanism (LBCCSM)" in Proceedings of the 2014 Design Engineering Technical Conferences & Computers and Information in Engineering Conference, Buffalo, N.Y., Aug. 17-20, 2014. DETC2014-34285].

FIGS. 1A-1B depict an LBCCSM element in an open position (FIG. 1A) and in a closed position (FIG. 1B). In FIG. 1A, the LBCCSM is in the open position includes first segment 100 in line with first living hinge 120 that couples first segment 100 to second segment 102 and fourth segment 106. An initial angle is formed by the intersection of second segment 102 and fourth segment 106, where this angle may be less than or equal to about 90°, for example. Second segment 102 is coupled to third segment 104 by second living hinge 122. Another initial angle is formed by the intersection of second segment 102 and third segment 104, where this angle may be greater than or equal to about 90°, for example.

Fourth segment 106 is coupled to fifth segment 108 by third living hinge 124. An initial angle is formed by the intersection of fourth segment 106 and fifth segment 108, where this angle may be greater than or equal to about 90°, for example, or otherwise substantially similar to the angle formed between second segment 102 and third segment 104. Sixth segment 110 is coupled to third segment 104 and fifth segment 10. An initial angle is formed by the intersection of third segment 104 and fifth segment 108, where this angle may be less than or equal to about 90°, for example, or otherwise substantially similar to the angled formed between second segment 102 and fourth segment 106.

Now referring to FIG. 1B, the LBCCSM is in the closed position and has first segment 100 in line with first living hinge 120 that couples first segment 100 to second segment 102 and fourth segment 106 with the resulting angle formed by the intersection of second segment 102 and fourth segment 106 being greater than or equal to about 180°. Second segment 102 is coupled to third segment 104 by second living hinge 122 with the resulting angle formed by the intersection of second segment and third segment being less than or equal to about 90°. Fourth segment 106 is coupled to fifth segment 108 by third living hinge 124 with the resulting angle formed by the intersection of fourth segment and fifth segment being less than or equal to about 90° or otherwise substantially similar to the resulting angle formed between second segment 102 and third segment 104. Sixth segment 110 is coupled to third segment 104 and fifth segment 108 with the resulting angle formed by the intersection of third segment 104 and fifth segment 108 remaining approximately the same as the corresponding initial angle.

As such, using basic geometric principles, the sum of the initial angles must be 360°, as must the sum of the resulting angles. During transition from the open position to the closed position, the angle between second segment 102 and fourth segment 106 increases, the angle between second segment 102 and third segment 104 decreases, the angle between fourth segment 106 and fifth segment 108 decreases, and the angle between third segment 104 and fifth segment 108 remains substantially constant.

Figure 3:
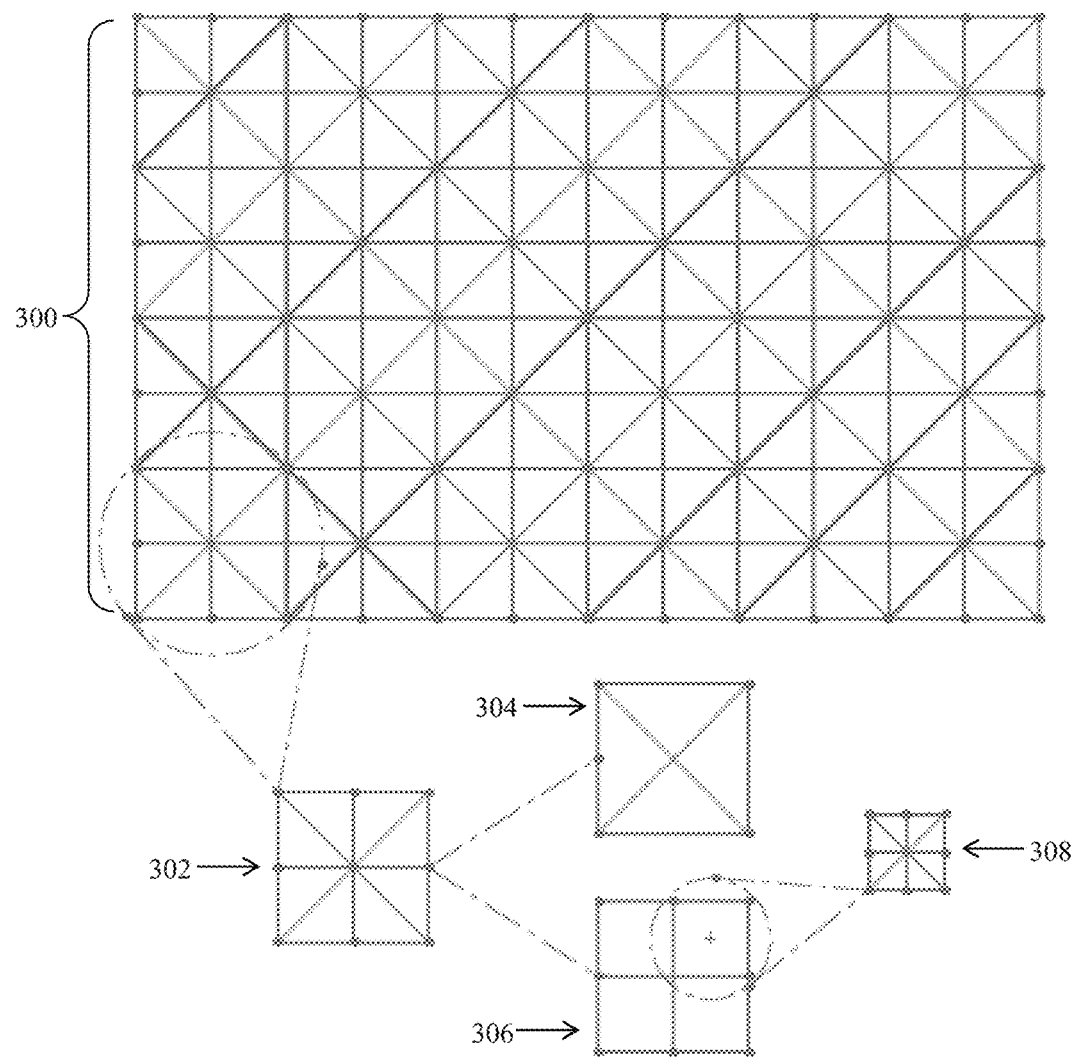
FIG. 3 depicts the square tessellations of the single-layer grid.

In certain embodiments, a single-layer grid of flexures, rigid links, and LBCCSMs can be configured to form square tessellations of a single-layer grid, as depicted in FIG. 3. The frame's initial shape is formed by coupling the flexures, rigid links, and LBCCSMs in a desired manner. To simplify the tessellation of this single-layer grid, a square sub-grid (m×s) is considered, where single elements of rigid links and LBCCSMs form the square sub-grid.

FIG. 3 shows that a single layer grid 300 can be formed by arrays of square sub-grid 302 which can, in turn, include eight (8) different elements that could be split in two different ways, as shown in element arrangement 304 and element arrangement 306. In order to minimize the number of connections/joints between elements, element arrangement 304 is preferred over the element arrangement 306. Element arrangement 306 can be considered as a miniature version of square sub-grid 302 as shown in mini square sub-grid 308. Because LBCCSMs are going to be used as the bistable elements in the chosen configuration, a study of each single combination between the rigid links and the LBCCSMs forming the six elements in element arrangement 304 was carried out considering minimum variable links that produce high degrees of freedom of the square element.

Figure 4:
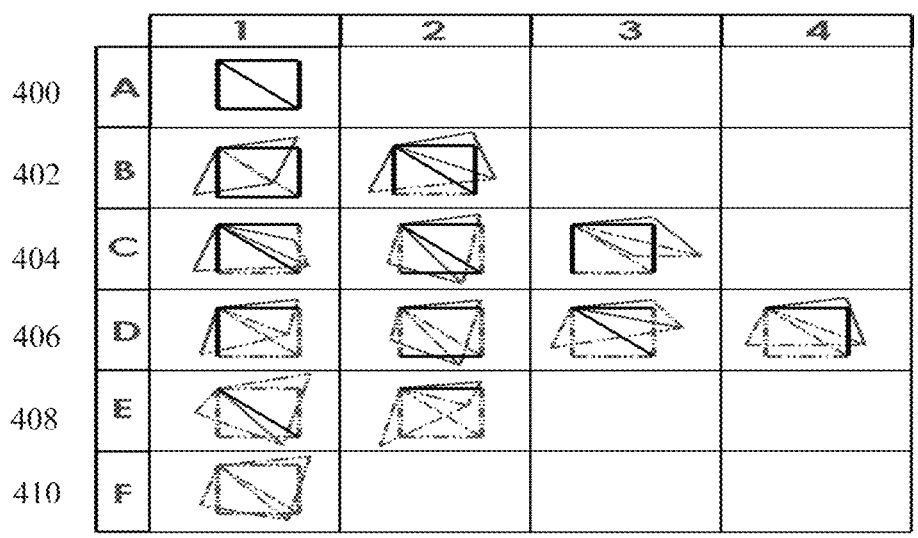
FIG. 4 depicts the different combination of $\binom{5}{n}$. The black line indicates rigid links; the broken red line indicates LBCCSM; the solid blue line indicates rigid links after morphing the square element; and the broken blue line indicates LBCCSM after morphing.

As an example, as depicted in FIG. 4, a $$\binom{5}{n}$$

concept can be seen, where five (5) is the total number of elements that can be selected—four sides and one diagonal—and (n) is the number of elements with variable length. Solid black lines are rigid links, dashed-red lines are LBCCSM, solid-blue lines are rigid links after morphing the square element, and broken blue lines are LBCCSM after morphing the square element. Row A 400 depicts a $$\binom{5}{5}$$

square element. Row B 402 depicts a $$\binom{5}{4}$$

square element. Row C 404 depicts a $$\binom{5}{3}$$

square element. Row D 406 depicts a $$\binom{5}{2}$$

square element. Row E 408 depicts a $$\binom{5}{1}$$

square element. Row F 410 depicts a $$\binom{5}{0}$$

square element. FIG. 4 provides a comparison for these types of square elements when configuring them in different ways, between having rigid links, LBCCSM, and morphing structures thereof.

Figure 5A:
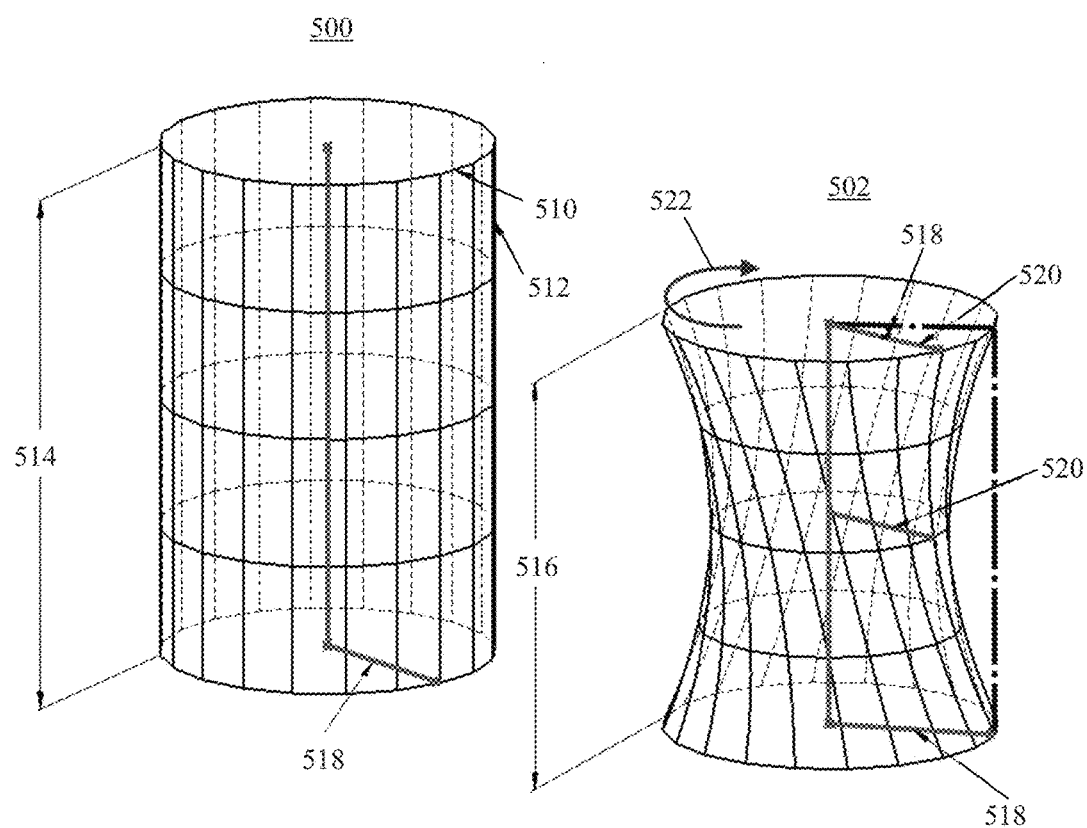
FIG. 5A depicts the parameters used to define the SMSF in the hyperbolic-shell morphing.
Figure 5B:
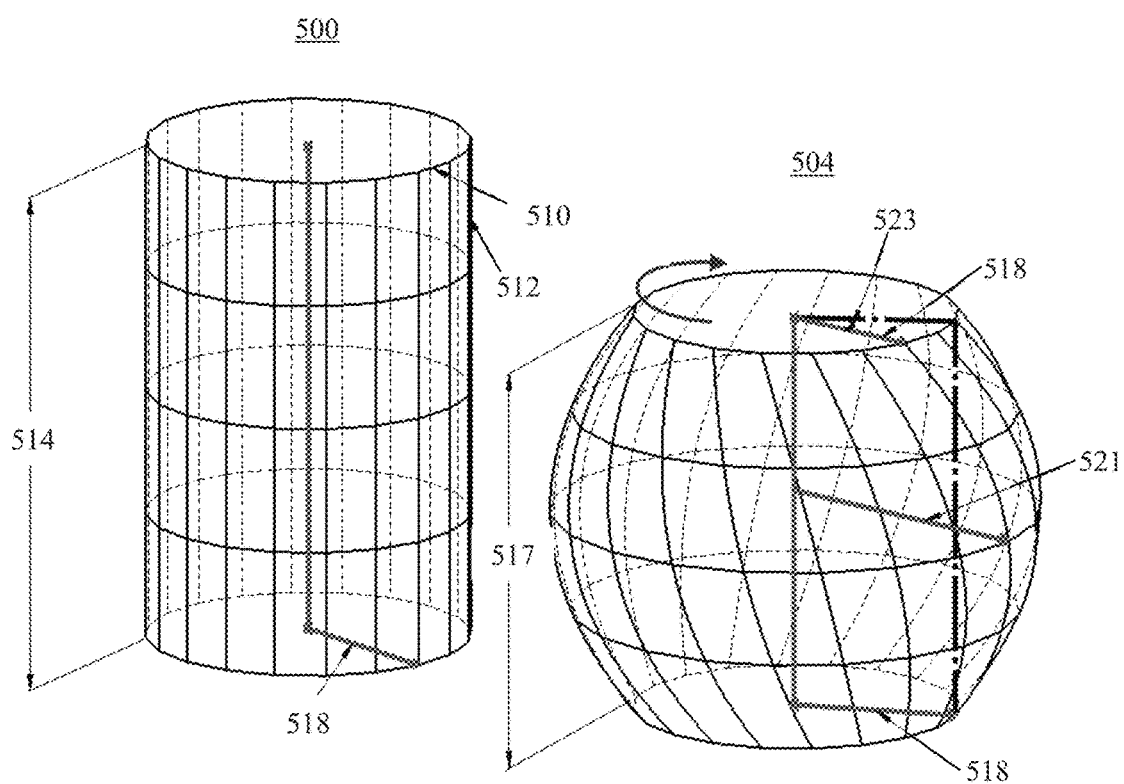
FIG. 5B depicts the parameters used to define the SMSF in the spherical-shell morphing.

FIGS. 5A-5B are schematics of certain embodiments of the current invention when the initial shape is chosen to be a cylinder, for example. FIG. 5A depicts a hyperbolic shell morph in its initial position 500 and after forces have been applied 502. Reference numeral 510 represents s, the number of polygon sides, and reference numeral 512 represents m, the number of total slices forming a cylindrical shape (variable s and m will become clearer as this specification continues). Initial height 514 is changed once forces are applied, where the applied forces result in final height 516. Initial radius of the shell 518 is consistent throughout initial height 514 in its initial position 500. Initial radius of the shell 518 does not change on the ends after forces have been applied 502; however, radius of the shell at mid-height 520 does change in final position 502 and is calculated by subtracting the amount of change in the radius of the shell at midway point from initial radius of the shell 518. When the appropriate force is applied to the hyperbolic shell in initial position 500, the shell follows a relative motion, indicated by reference numeral 522, resulting in final position 502.

FIG. 5B depicts spherical shell morph in its initial position 500 and after forces have been applied 504. Initial height 514 is changed once forces are applied, where the applied forces result in final height 517. Initial radius of the shell 518 is consistent throughout initial height 514 in its initial position 500. Initial radius of the shell 518 does not change on the ends after forces have been applied 504; however, radius of the shell at mid-height 521 does change in final position 504 and is calculated by adding the amount of change in the radius of the shell at midway point from initial radius of the shell 518. When the appropriate force is applied to the hyperbolic shell in initial position 500, the shell follows a relative motion, indicated by reference numeral 522, resulting in final position 504.

Figure 5C:
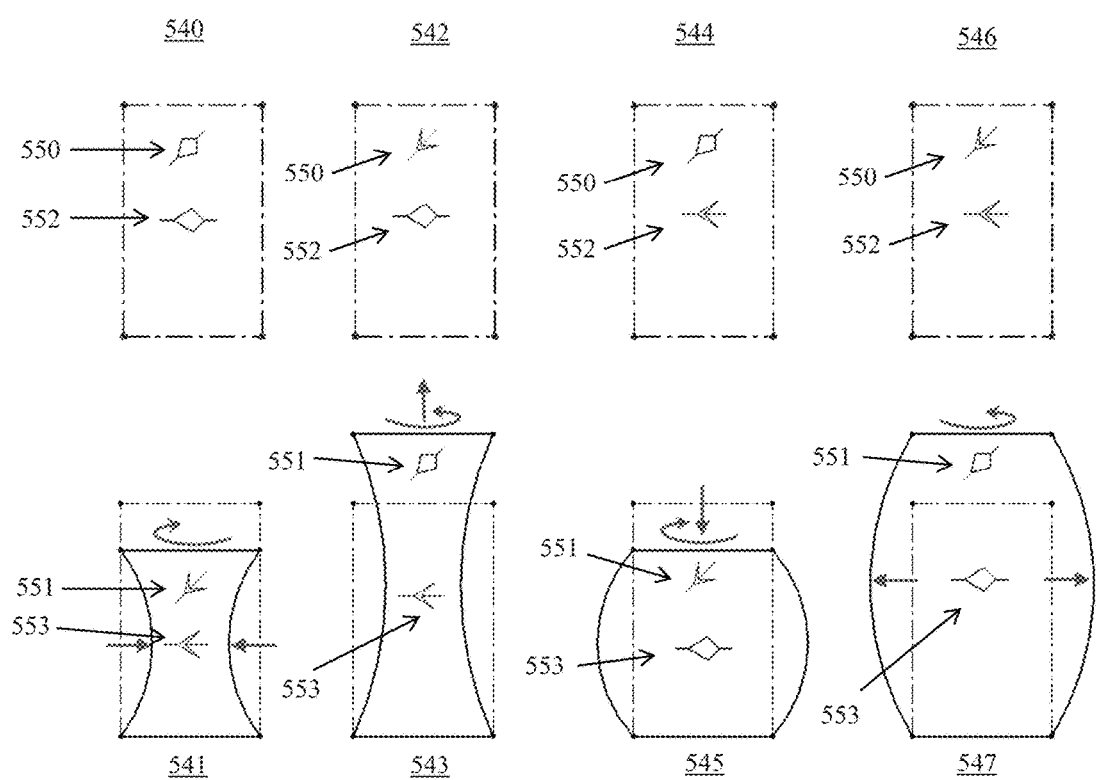
FIG. 5C depicts loading conditions for each of the four design configuration from Table 2a-d.

FIG. 5C depicts the type of applied loads for each design to morph the space-frame from its initial shape to its resulting shape; these loads can be applied simultaneously or individually depending on the application. Design 540 shows the first sphere having initial diagonal element position 550 in the open position and initial radial element position 552 in the open position. Diagonal and radial forces are then applied, resulting in hyperbolic shell 541 with a shorter height. Final diagonal element position 551 and final radial element position 553 are both left in the closed position. This results in a negative Poisson for design 540.

Design 542 shows the first sphere having initial diagonal element position 550 in the closed position and initial radial element position 552 in the open position. Diagonal and radial forces are then applied, resulting in hyperbolic shell 543 with a taller height. Final diagonal element position 551 is left in the open position while final radial element position 553 is left in the closed position. This results in a positive Poisson for design 542.

Design 544 shows the first sphere having initial diagonal element position 550 in the open position and initial radial element position 552 in the closed position. Diagonal and radial forces are then applied, resulting in spherical shell 545 with a shorter height. Final diagonal element position 551 is left in the closed position while the final radial element position 553 is left in the open position. This results in a positive Poisson for design 544.

Design 546 shows the first sphere having initial diagonal element position 550 in the closed position and initial radial element position 552 in the closed position. Diagonal and radial forces are then applied, resulting in spherical shell with a taller height 547. Final diagonal element position 551 and final radial element position 553 are both left in the open position. This results in a negative Poisson.

Figure 6:
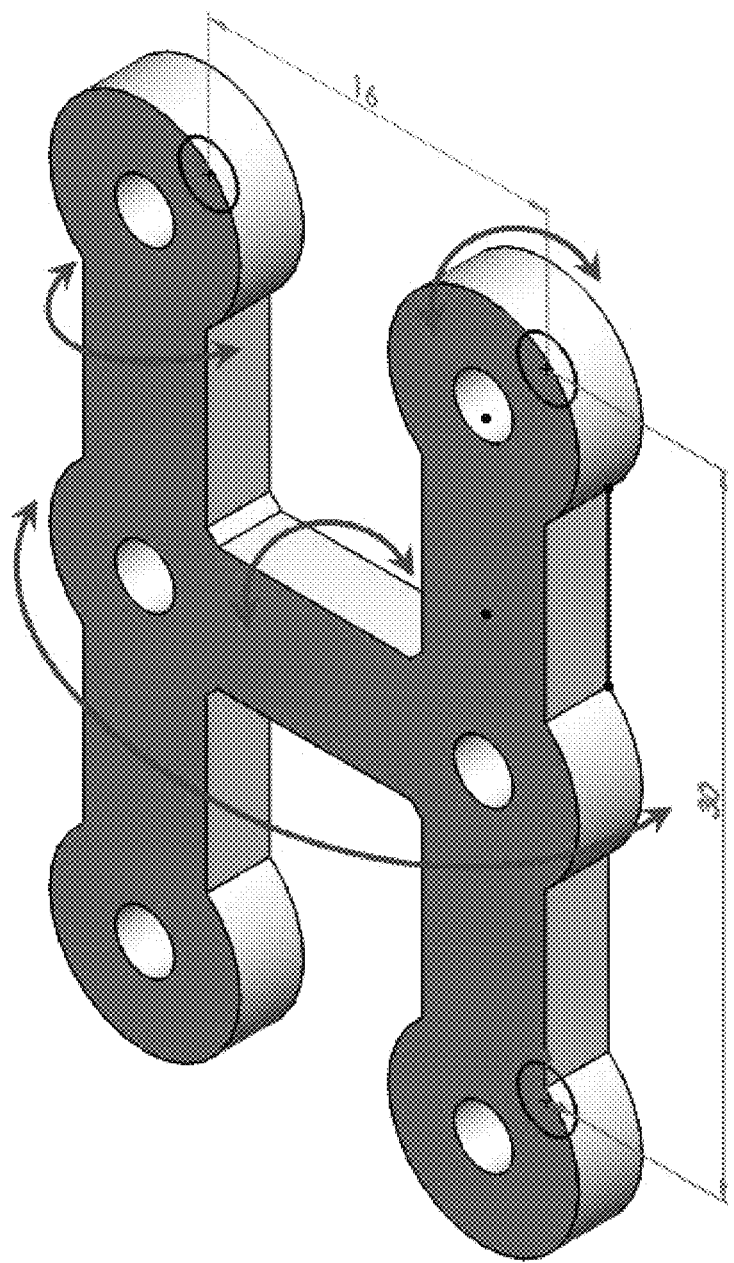
FIG. 6 depicts the H-shape joint used in space-frame and its DOFs.

FIG. 6 depicts an H-shaped joint that is symmetrical across the mid-plane. This H-shaped joint may be optional in coupling an array of LBCCSM together, as it reduces the number of different LBCCSM required by half. The H-shaped joint is flexible so that each end can bend and twist independently of each other.

Figure 7A:
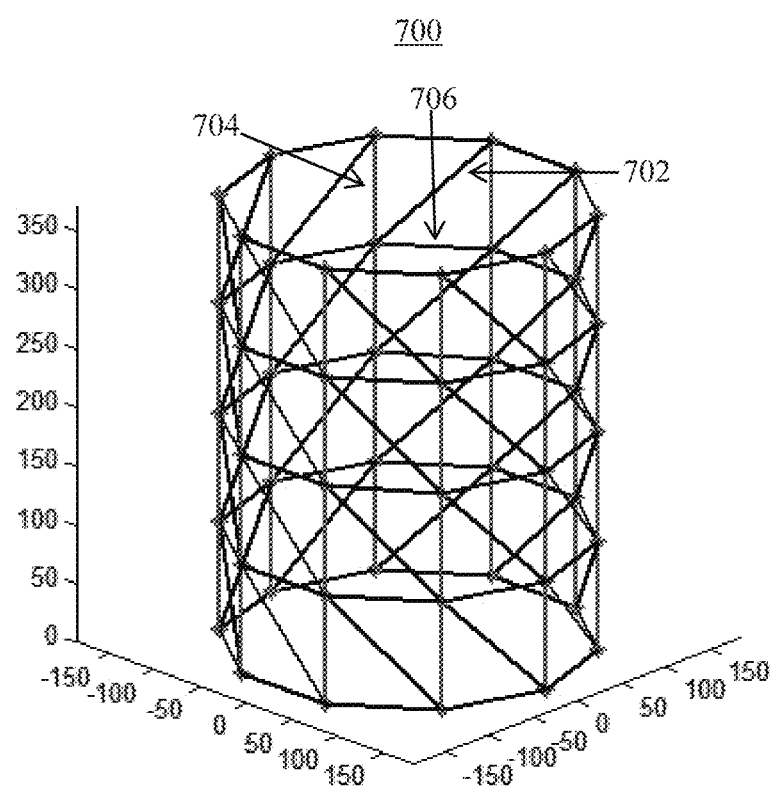
FIG. 7A depicts hyperbolic SMSF in its initial state.
Figure 7B:
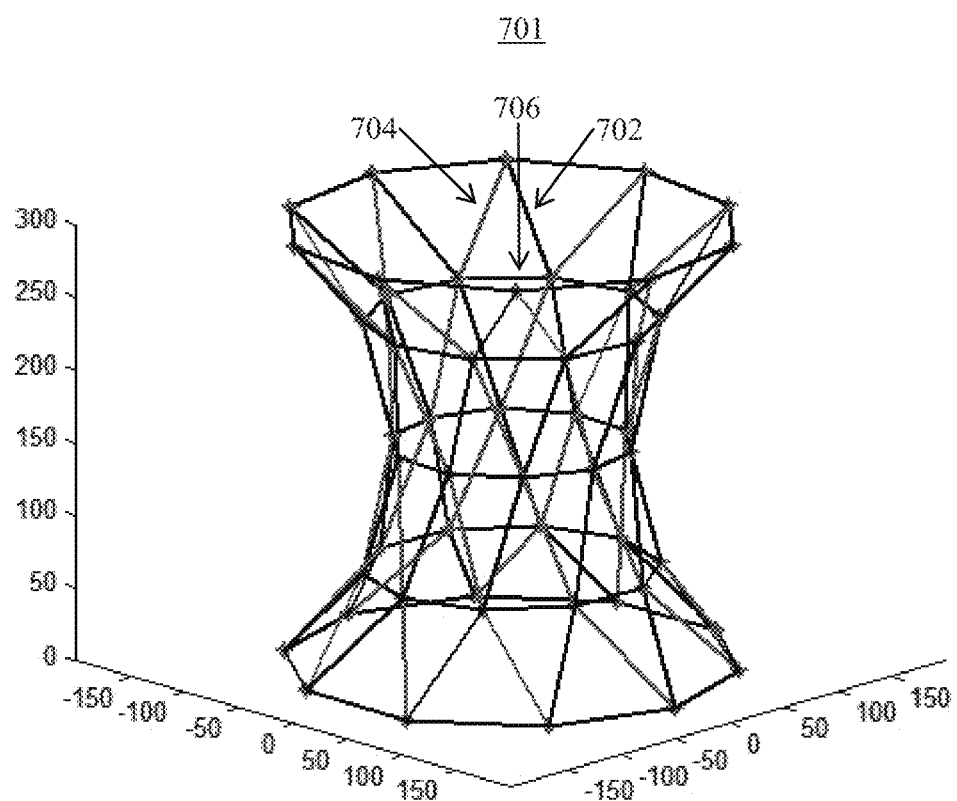
FIG. 7B depicts hyperbolic SMSF in its resulting state.

FIG. 7A depicts a SMSF in its initial state 700. Bistable elements in diagonal direction 702 and radial direction 704 combined with rigid links in vertical direction 706 make up the device shown in FIG. 7A. Bistable elements in diagonal 702 and radial 704 directions are in the open position. FIG. 7B depicts a SMSF in its resulting state 701. Bistable elements in diagonal direction 702 and in the radial direction 704, combined with rigid links in vertical direction 706, form the device shown in FIG. 7B. Bistable elements in the diagonal direction 702 and in the radial direction 704 are in the closed position.

Figure 8A:
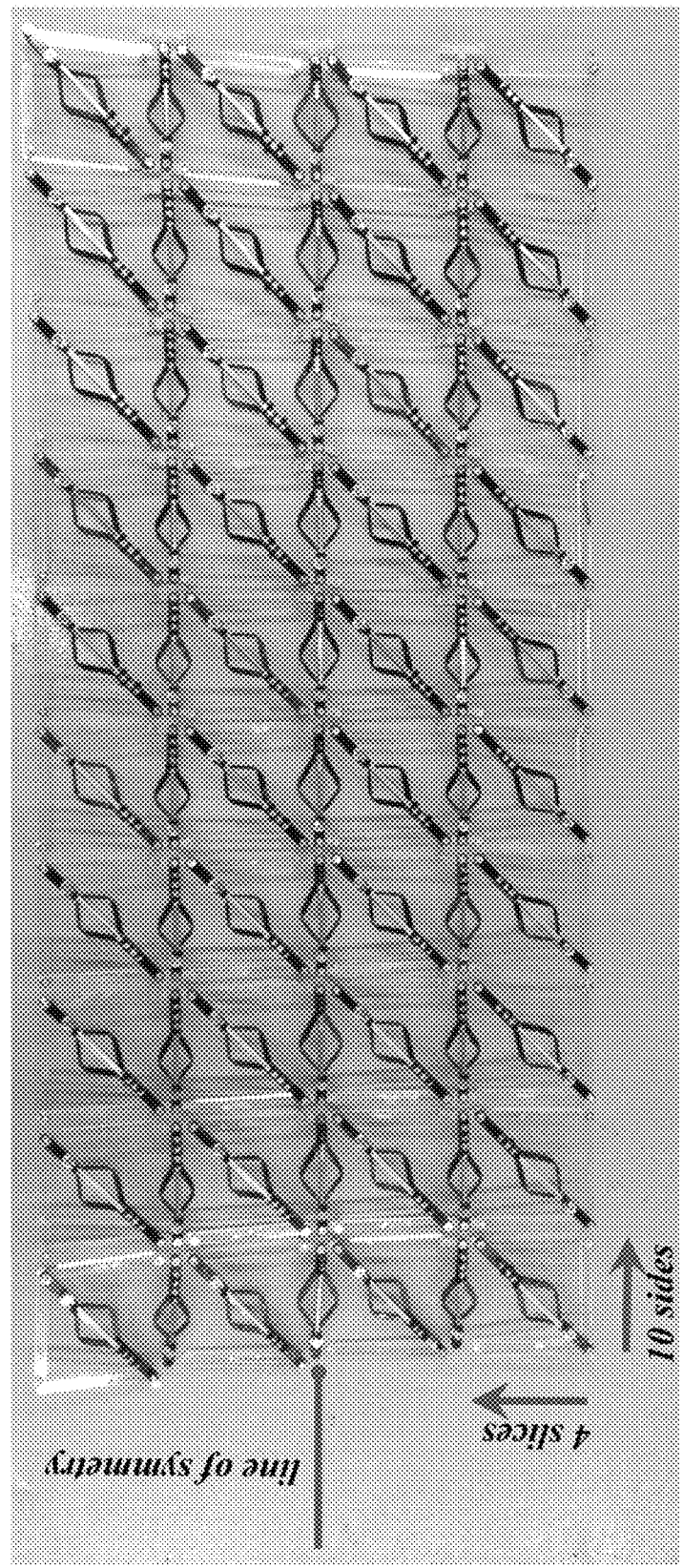
FIG. 8A depicts the single-layer grid tessellation showing the LBCCSM placement for the hyperbolic SMSF.

FIG. 8A depicts a fabricated single-layer grid in its two dimensional form showing the sub-grid arraying pattern (diagonal and radial LBCCSM elements are open). This is analogous to the schematic of FIG. 3 and includes an array of the LBCCSM elements of FIG. 1A. This single-layer grid can be manipulated into any desired shape. It can also be understood that the single-layer grid can be fabricated in any way, with any number of "slides" and "slices" (refer to FIG. 8A), thus permitting an infinite number of configurations not only in the 2D grid, but also in the 3D initial shape of the device.

Figure 8B:
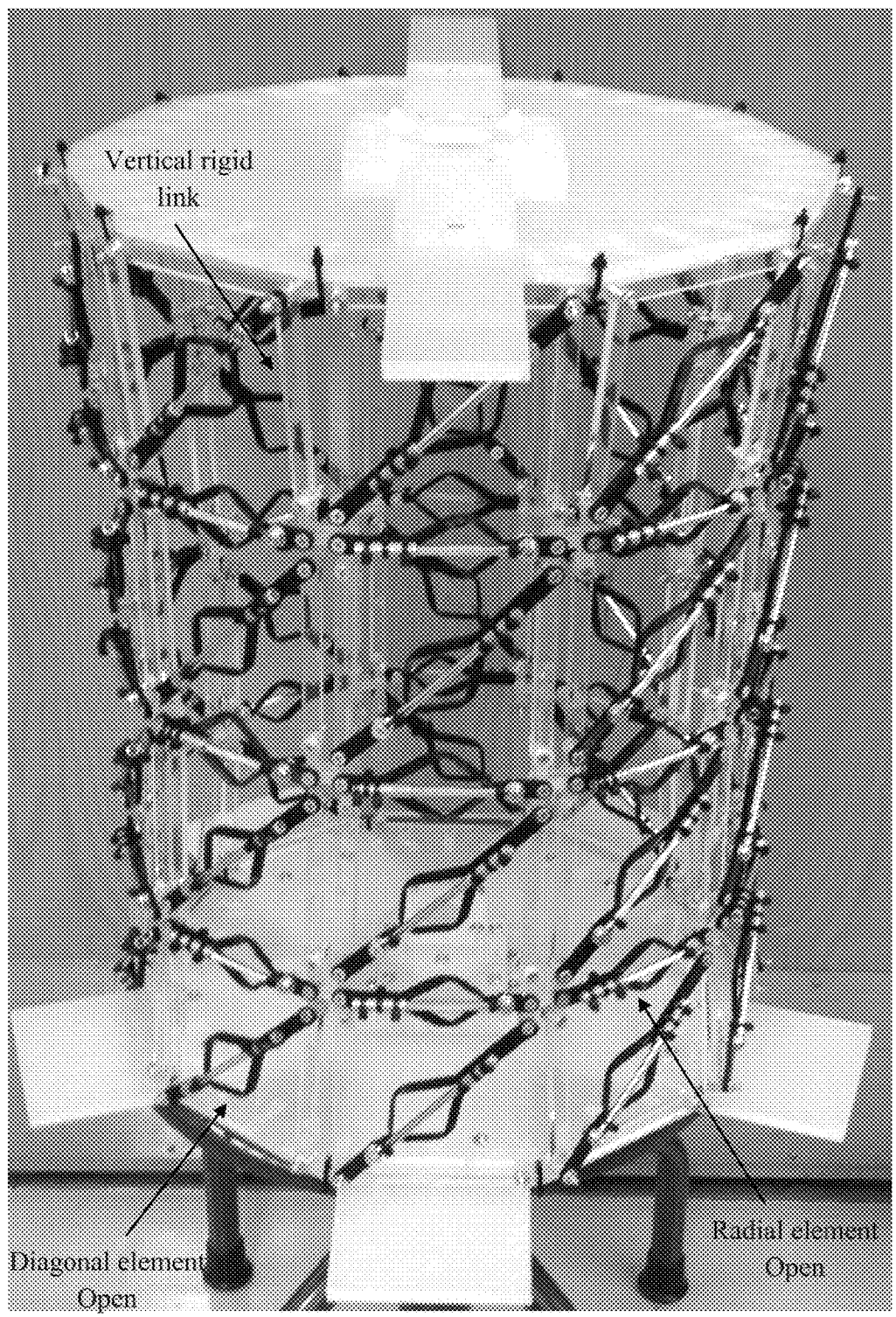
FIG. 8B depicts the hyperbolic SMSF before morphing showing the grid after being bent into space-frame's initial cylindrical shape.
Figure 8C:
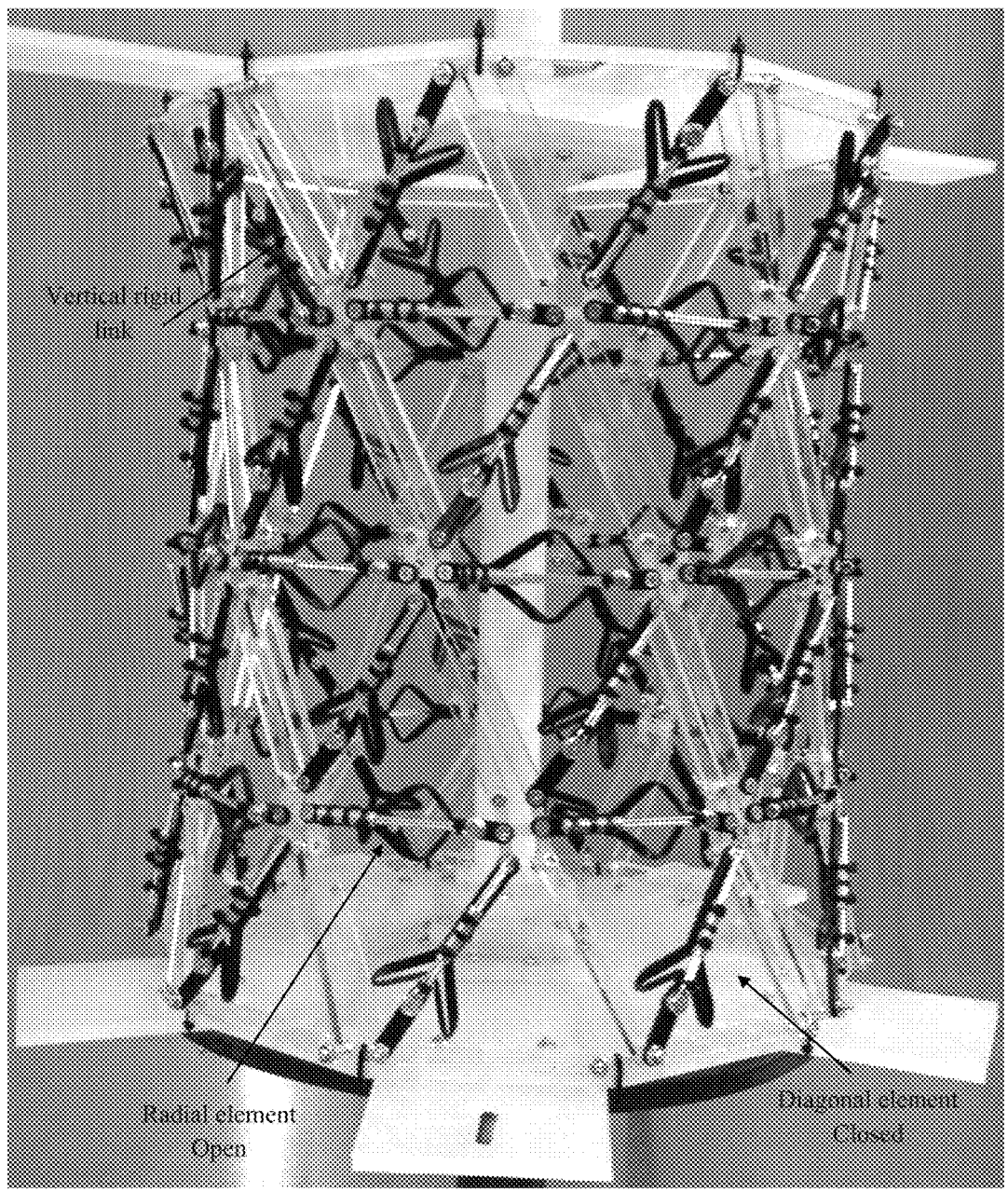
FIG. 8C depicts the hyperbolic SMSF after torque loading.

As illustration, the grid of FIG. 8A was bent or otherwise manipulated and secured in an initial cylindrical shape of the space frame, as can be seen in FIG. 8B. As depicted in this figure, the diagonal and radial elements are both in the open position. FIG. 8C depicts the space frame after the torque was applied first to deform the diagonal LBCCSM elements into a position that can be seen in FIG. 1B. The diagonal elements have morphed from being in the open position in FIG. 8B (see also FIG. 1A) to being in the closed position in FIG. 8C (see also FIG. 1B) because of the torque force that was applied to the SMSF.

Figure 8D:
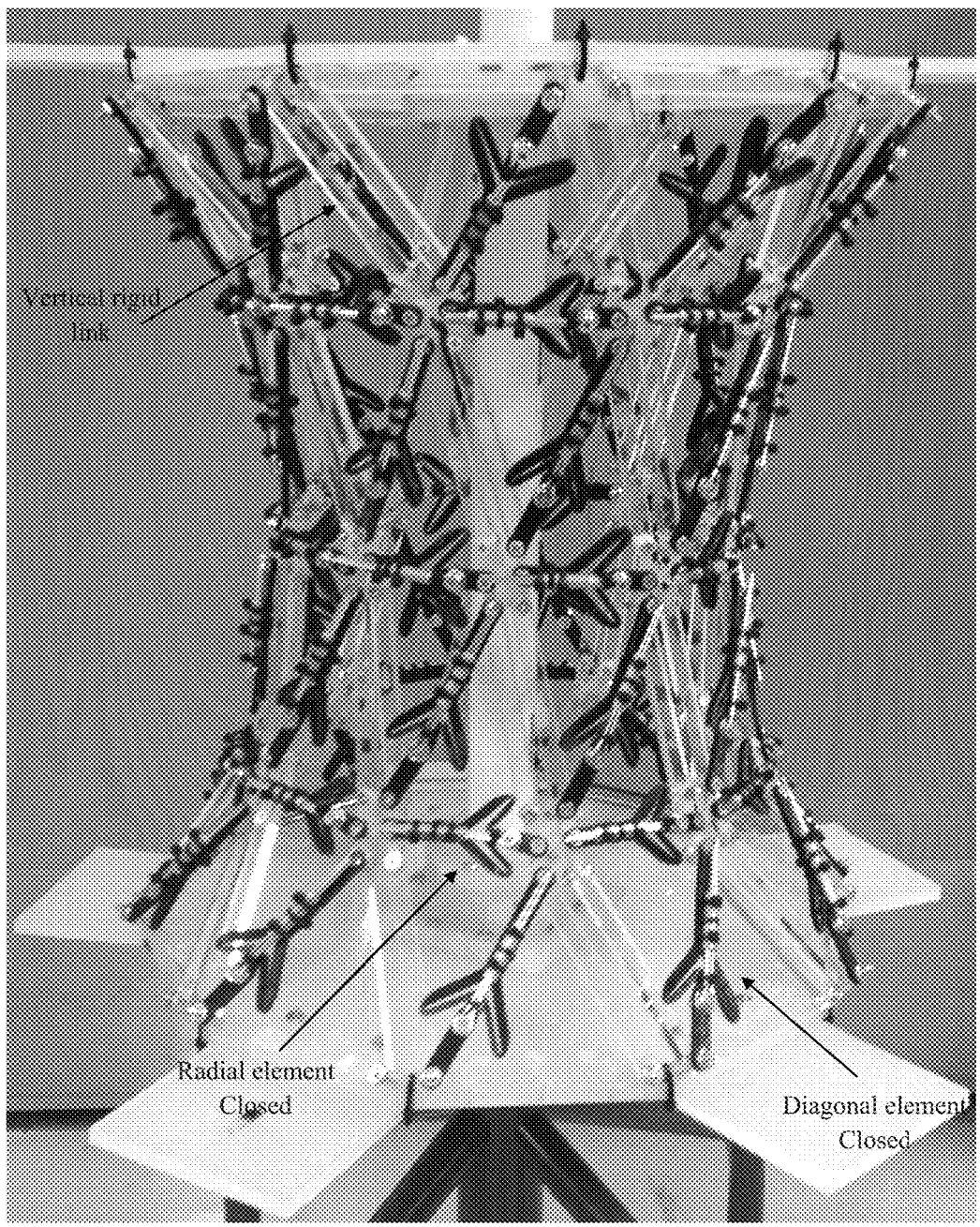
FIG. 8D depicts the hyperbolic SMSF after radial and vertical loading.

FIG. 8D depicts the space frame after torque force was applied to deform the diagonal LBCCSM elements and after the radial force was applied to deform the radial LBCCSM elements, forming the hyperbolic SMSF. The radial elements have morphed from being in the open position in FIGS. 8B-8C (see also FIG. 1A) to being in the closed position in FIG. 8D (see also FIG. 1B) because of the radial force that was applied to the SMSF. The diagonal and radial elements have been transformed from their original open position to their resulting closed position; the SMSF is stable in both positions.

Figure 9A:
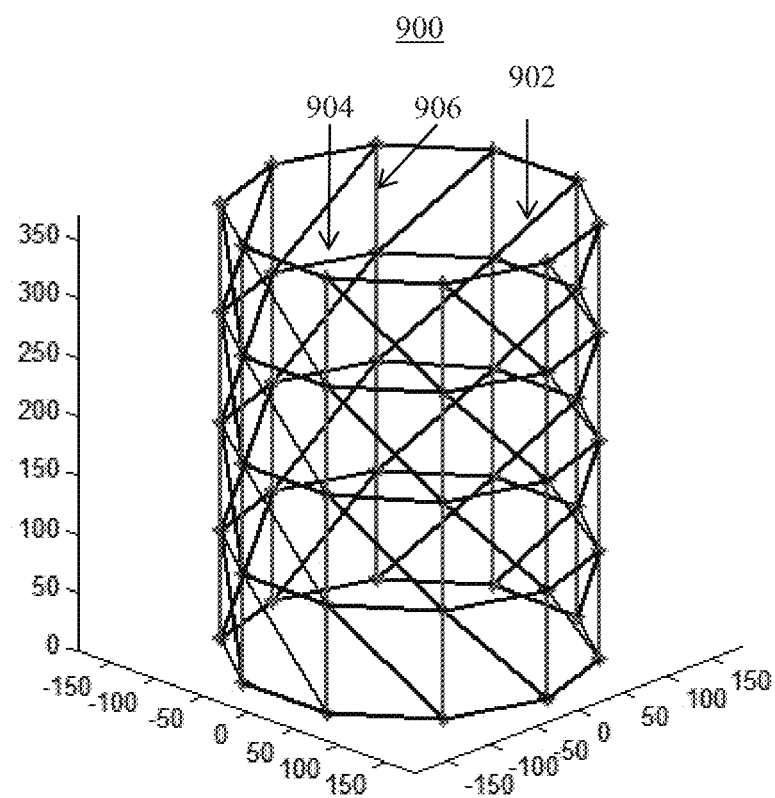
FIG. 9A depicts the spherical SMSF in its initial state.
Figure 9B:
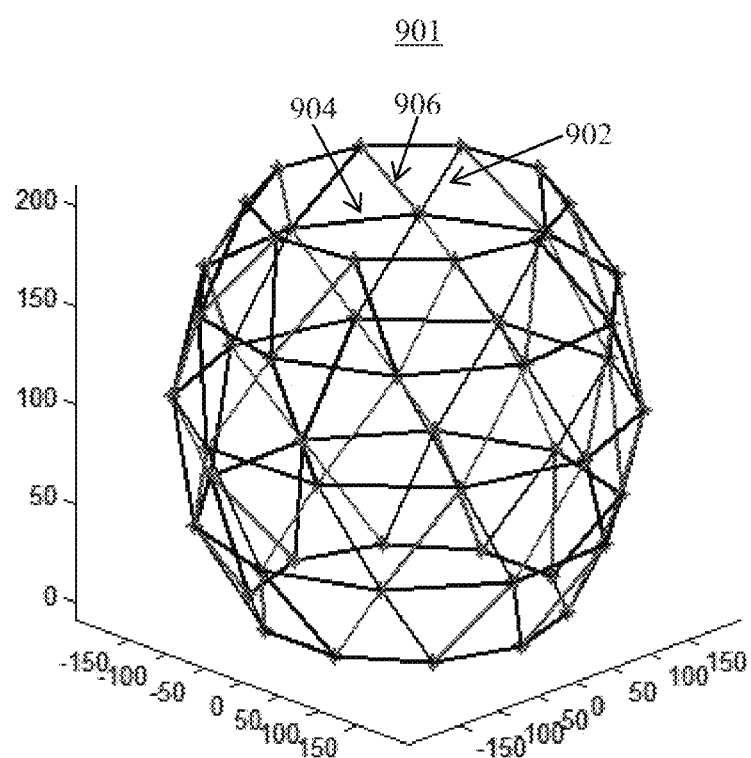
FIG. 9B shows the spherical SMSF in its resulting state.

FIG. 9A depicts a SMSF in its initial state 900. Bistable elements in the diagonal direction 902 and in the radial direction 904 combined with rigid links in vertical direction 906 make up the device shown in FIG. 9A. Bistable elements in diagonal direction 902 are in the open position, and bistable elements in radial direction 904 are in the closed position. FIG. 9B depicts a SMSF in its resulting state 901. Bistable elements in the diagonal direction 902 and in the radial direction 904, combined with rigid links in vertical direction 906, form the device shown in FIG. 9B. Bistable elements in diagonal direction 902 are in the closed position, and bistable elements in radial direction 904 are in the open position.

Figure 10A:
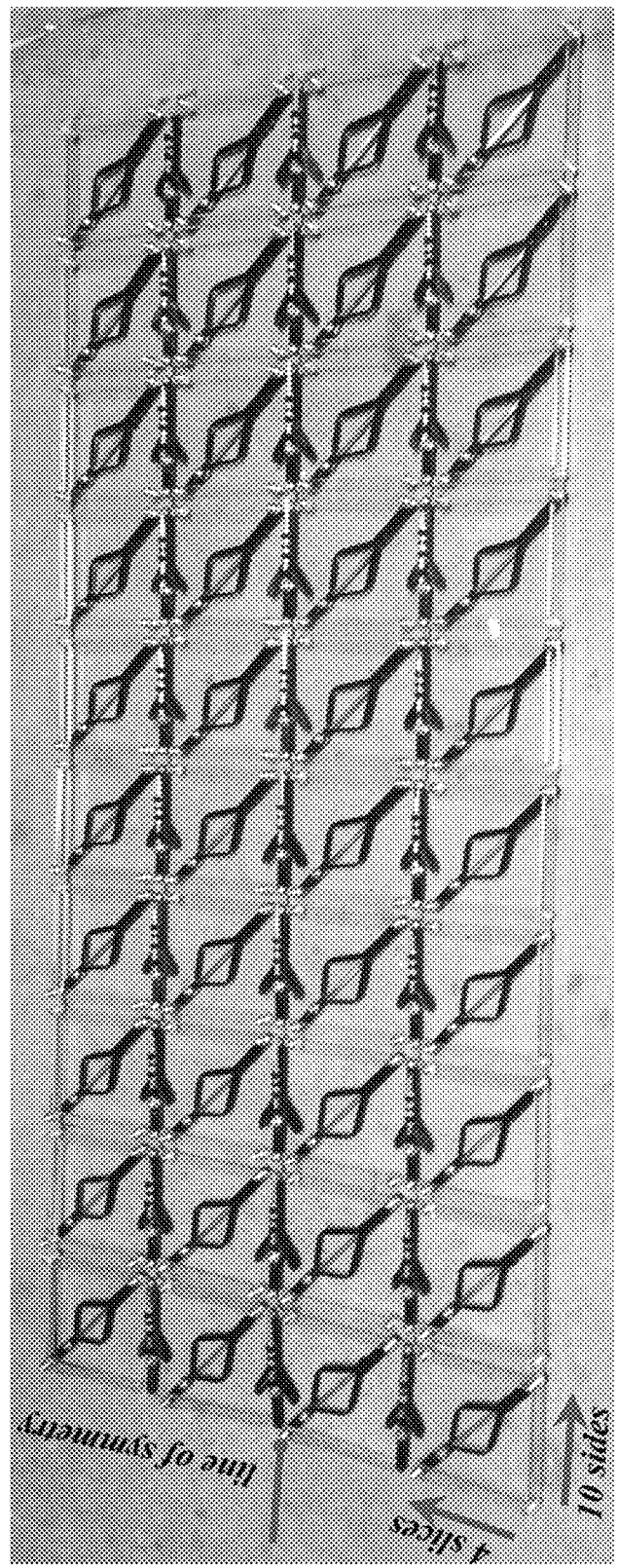
FIG. 10A depicts the single-layer grid tessellation showing the LBCCSM placement for the spherical SMSF.

FIG. 10A depicts a fabricated single-layer grid in its two dimensional form showing the sub-grid arraying pattern (diagonal LBCCSM elements are open and radial LBCCSM elements are closed). This is analogous to the schematic of FIG. 3 and includes an array of the LBCCSM elements of FIG. 1A. This single-layer grid can be manipulated into any desired shape. It can also be understood that the single-layer grid can be fabricated in any way, with any number of "slides" and "slices" (refer to FIG. 8A), thus permitting an infinite number of configurations not only in the 2D grid, but also in the 3D initial shape of the device.

Figure 10B:
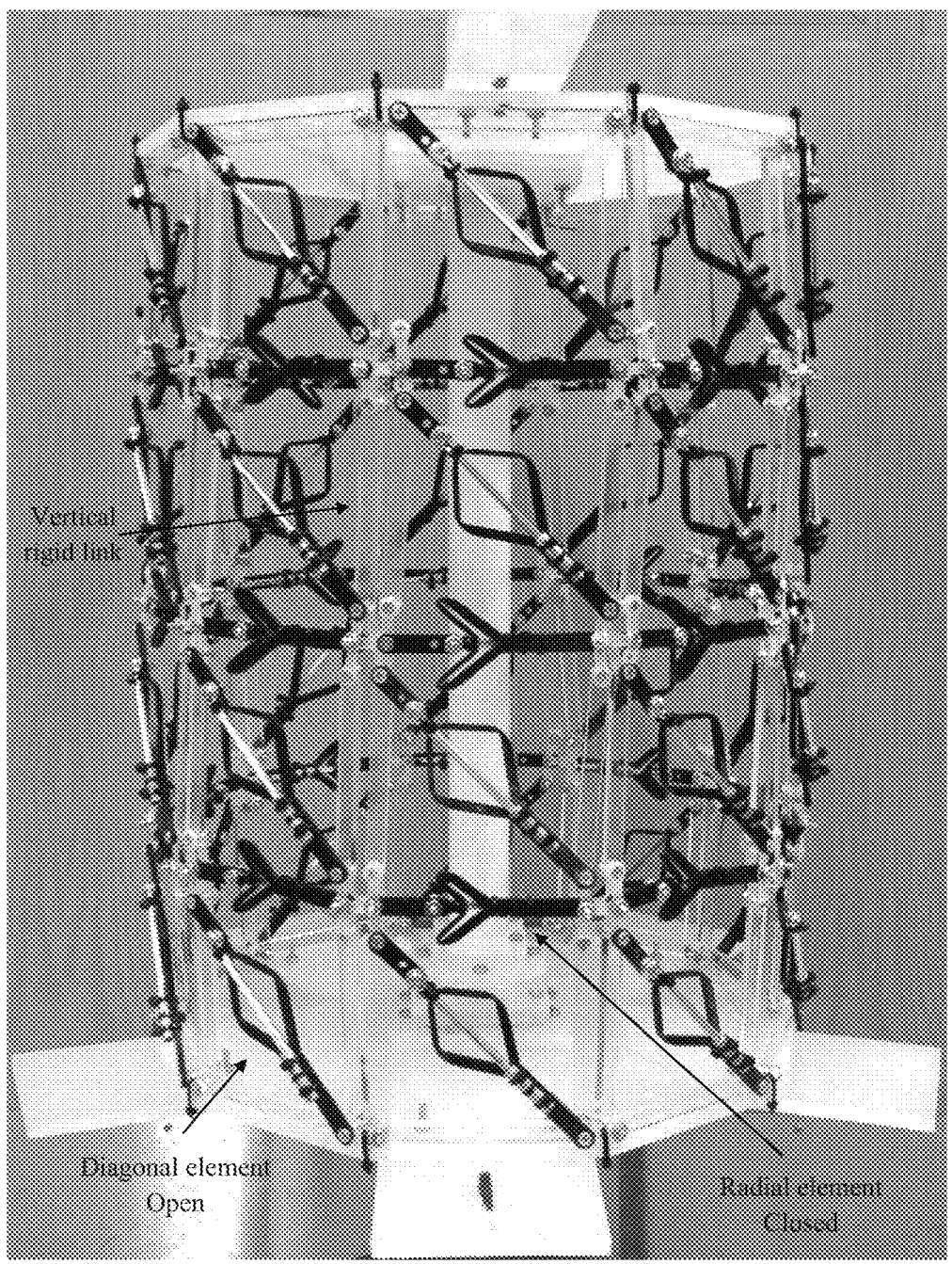
FIG. 10B depicts the spherical SMSF before morphing showing the grid after being bent to space-frame's initial cylindrical shape.
Figure 10C:
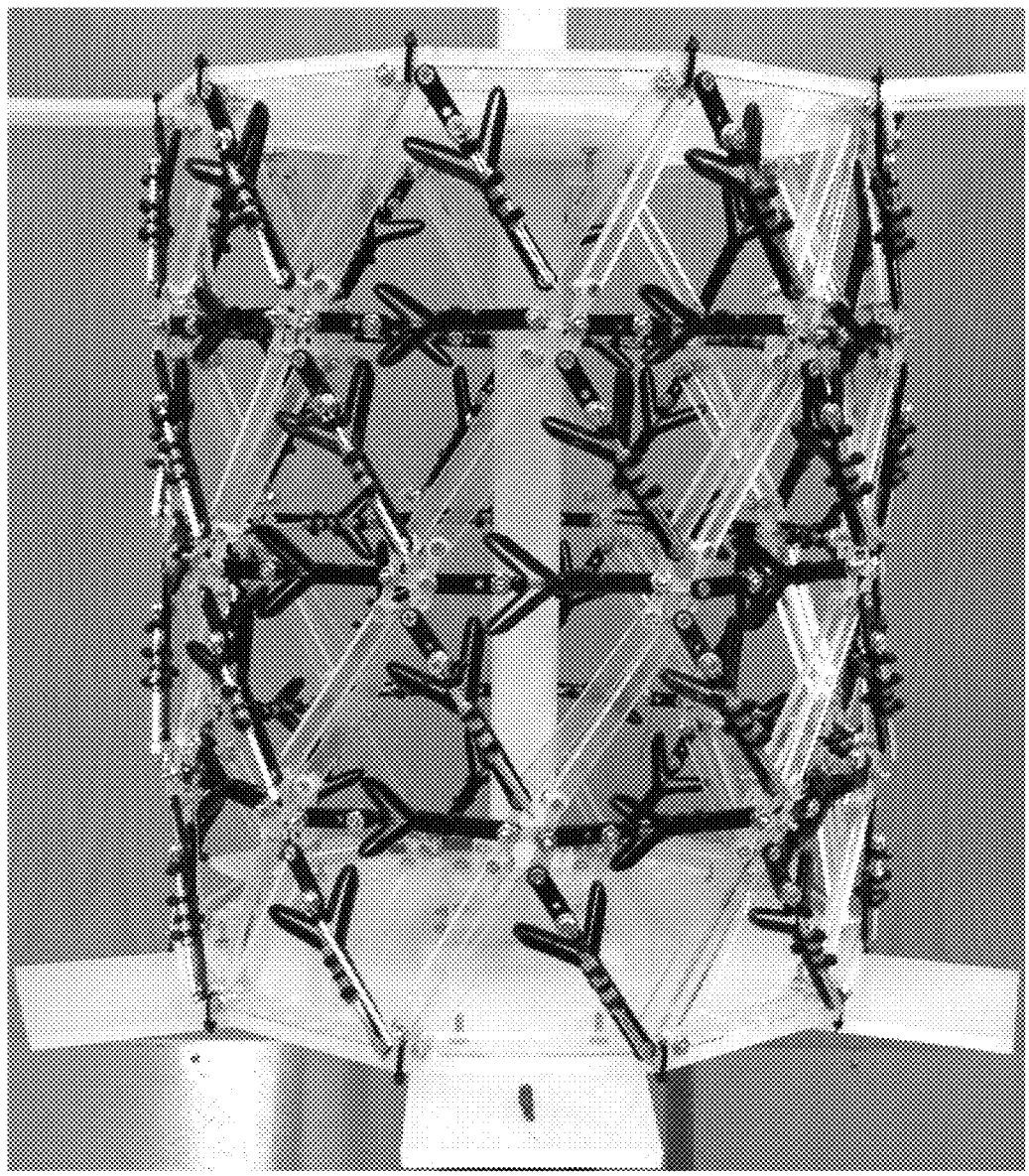
FIG. 10C depicts the spherical SMSF after torque loading.

As illustration, the grid of FIG. 10A was bent or otherwise manipulated and secured in an initial cylindrical shape of the space frame, as can be seen in FIG. 10B. As depicted in this figure, the diagonal elements are in the open position and the radial elements are in the closed position. FIG. 10C depicts the space frame after the torque was applied first to deform the diagonal LBCCSM elements. The diagonal elements have morphed from the open position in FIG. 10B to the closed position in FIG. 10C because of the torque force that was applied to the SMSF.

Figure 10D:
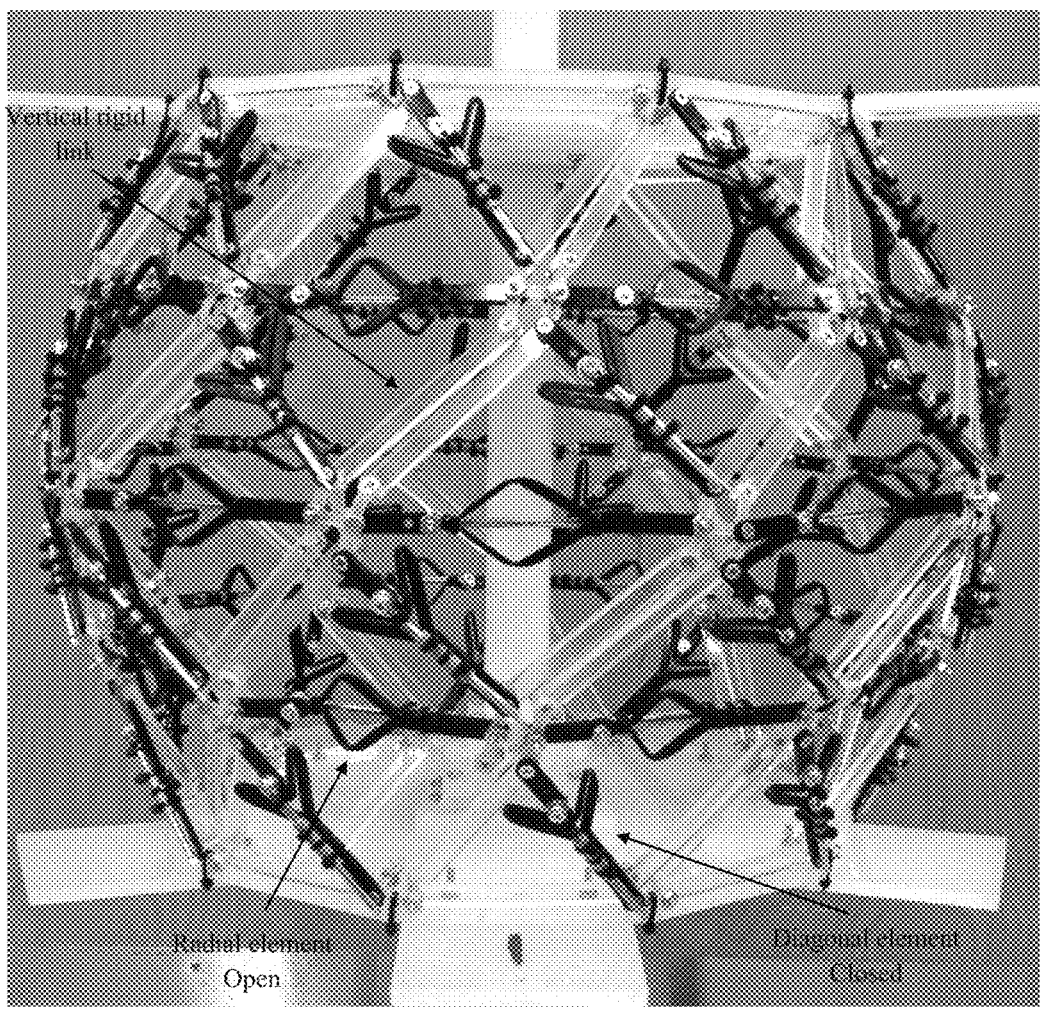
FIG. 10D depicts the spherical SMSF after radial and vertical loading.

FIG. 10D depicts the space frame after torque was applied to deform the diagonal LBCCSM elements and after the radial force was applied to deform the radial LBCCSM elements, thus forming the spherical SMSF. The radial elements have morphed from the closed position in FIG. 10C to the open position in FIG. 10D because of the radial force that was applied to the SMSF. The diagonal and radial elements have been transformed from their original positions to their resulting positions; the SMSF is stable in both positions.

Methods of SMSF Modeling

The methods followed in the SMSF modeling are described herein starting with the tessellation of the single-layer grid into sub-grid elements, followed by description of the mathematical algorithm used accounting for designs inputs, the functionality of types of elements used and a model possibility check to insure the geometry before and after morphing is valid. Design strategies are carried out in order to fabricate the SMSF. The follow are the parameters used herein and their definitions:

s number of the polygon sides.
m number of the total slices forming a cylindrical shape.
n number of the bistable elements LBCCSM.
$h_o$ space-frame's initial height before morphing [mm].
$h_f$ space-frame's morphed height [mm].
h space-frame's height at each slice [mm].
$\rho_o$ space-frame's initial circumscribed radius [mm].
$\rho_f$ space-frame's morphed circumscribed radius [mm].
$\rho$ space-frame radius across the height [mm].
$\Delta\rho$ SMSF change in radius [mm].
$l_s$ length of each polygon's side [mm].
$\Delta\theta$ relative rotation between two parallel planes [deg].

A. SMSF Tessellation

The frame's initial shape is constructed from a single-layer grid of flexures, rigid links and LBCCSMs. To simplify the tessellation of this single-layer grid, a square sub-grid (m×s) is considered where single elements of rigid links and LBCCSMs form it. FIG. 3 shows that single-layer grid 300 is formed by arrays of square sub-grid 302, which includes eight (8) different elements that could be split in two different ways, as shown by reference numerals 304 and 306; and in order to minimize the number of connection/joint between elements, element arrangement 304 is preferred over element arrangement 306. Arrangement 306 can be considered as a miniature sub-grid of 302, as shown by reference numeral 308. Because the LBCCSMs are going to be used as the bistable elements in the chosen configuration, a study of each single combination between the rigid links and the LBCCSMs forming the six elements in configuration 304 is carried out considering minimum variable links that produce high degrees of freedom of the square element.

In order for a selected square frame formed of six elements to be stable, only five elements need to be constrained, and thus a unique method was used herein to determine which of the elements needed to be a rigid link and which needed to be bistable by using the LBCCSM. For any square element, two degrees of freedom are located at each corner totaling 8 DOF and by subtracting two DOF for the position (local origin of the square) and one DOF for orientation leaves five total DOF that describe deformation of the square—four DOF for side deformations and one DOF for shear deformation. The novel method $$\binom{5}{n}$$

concept) is carried out where five (5) is the total number of elements that can be selected, four sides and one diagonal, and (n) is the number of elements with variable length. In order to choose which of the 5 elements can be selected as a rigid link or considered to be LBCCSM, the different combinations between the $$\binom{5}{n}$$

are shown in FIG. 4. Table 1 illustrates each combination by identifying which element is being selected as LBCCSM and its type of being a side or a diagonal. Moreover, it is indicated if the selected LBCCMSs location would move independently from each other, the ability to be arrayed vertically and horizontally, the number of shapes it can form, and the possibility to morph from its initial square form to a trapezoidal and parallelogram as a resulting shape. The ability of the sub-grid square to be arrayable in certain configurations can be beneficial in particular applications; for example, in order for two sub-grid squares to be horizontally arrayable, the right side of the left square should behave the same way as the left side of the right square, so they can move in conjunction with each other.

TABLE 1

The different combination of $\binom{5}{n}$ and their criteria (reference FIG. 4).

| ref. FIG. 4 | $\binom{5}{n}$ | LBCCSM location | | Arrayable configuration | | | Morphing | |
|---|---|---|---|---|---|---|---|---|
| | | Side | Diag-on-al | Independent movment of LBCCSM | Vertical | Hori-zon-tal | Number of shapes formed | Morphing to Trapezoid | Morphing to Parallelo-gram |
| A1 | $\binom{5}{0}$ | 0 | 0 | N/A | Y | Y | 1 | N | N |
| B1 | $\binom{5}{1}$ | 1 | 0 | Y | Y | Y | 2 | N | Y |
| B2 | | 0 | 1 | Y | N | Y | 2 | N | N |
| C1 | $\binom{5}{2}$ | 2 adj | 0 | N | N | N | 4 | N | N |
| C2 | | 2 opp | 0 | Y | Y | Y | 4 | Y | Y |
| C3 | | 1 | 1 | Y | N | Y | 4 | Y | Y |
| D1 | $\binom{5}{3}$ | 2 adj | 1 | Y | N | N | 8 | Y | Y |
| D2 | | 2 opp | 1 | Y | Y | Y | 8 | Y | Y |
| D3 | | 3 adj | 0 | Y | N | Y | 8 | Y | Y |

TABLE 1-continued

The different combination of $\binom{5}{n}$ and their criteria (reference FIG. 4).

| ref. FIG. 4 | $\binom{5}{n}$ | LBCCSM location | | Independent movment of LBCCSM | Arrayable configuration | | Number of shapes formed | Morphing to Trapezoid | Morphing to Parallelogram |
|---|---|---|---|---|---|---|---|---|---|
| | | Side | Diagonal | | Vertical | Horizontal | | | |
| D4 | | 2 adj | 1 | Y | N | N | 8 | Y | Y |
| E1 | $\binom{5}{4}$ | 4 | 0 | Y | Y | Y | 16 | Y | Y |
| E2 | | 3 | 1 | Y | N | Y | 16 | Y | Y |
| F1 | $\binom{5}{5}$ | 4 | 1 | Y | Y | Y | 32 | Y | Y |

(adj. for adjacent)
(opp. for opposite)
(Y for Yes, N for No)

B. Design Algorithm

Because the start of the design is a single-layer grid formed by (m×s) chain of sub-grid square element that would bend into the space-frame's initial cylindrical shape, it is important to identify the design space and limitation to minimize the design possibilities and yet achieve the desired outcome. For illustration purposes, a cylindrical shell morphing into to either a hyperbolic shell or a spherical shell is described herein to demonstrate one of the applications of the LBCCSMs, where the resulting shells also illustrate a change of the shell's diameter across their respective heights.

The circumference of the space-frame's initial cylindrical shape can be approximated by a polygon, which the number of sides (s) is considered as a design input, and considering the initial and resulting morph of the space-frame has its two ends identical without morphing, the top and bottom of the s-sided polygon can be constructed out of individual rigid links joined by the space frame's end. The initial height ($h_o$) of the cylinder can be divided into (m) slices with vertical elements that are made of rigid links to provide stability to the space-frame and to act as force transmitter.

The height of each slice can be equal to the length of the polygon's side ($l_s$) because a square sub-grid was the chosen shape. Moreover, three other inputs of the design are the initial radius of the circumscribed circle ($\rho_o$), the change in radius ($\Delta\rho$), and the two ends of the space-frame plane's relative rotation ($\Delta\theta$), as shown in FIG. 5A for the hyperbolic-shell morph and FIG. 5B for the spherical-shell morph. This relative rotation of the planes is the main control in morphing the space-frame, and it is carried out using the applied rotation at the ends.

The mathematical modeling was done using MATLAB utilizing the polygon's geometry to locate each point on the initial space-frame and the corresponding location for that point on the space-frame's resulting shape. Lines then connect those points, and its lengths are compared to calculate the change in length that would be used in designing the specific LBCCSM for that element. Force analysis was not included herein, as only the kinematic use of the LBCCSMs is addressed.

The following are the main equations used in the MATLAB code:

From the polygon's geometry:

$$l_s = 2*\rho_o*\sin(i/s) \tag{1}$$

$$h_o = m*l_s \text{ where } h = m*h_o \tag{2}$$

The equation used to describe the profile of the space-frame as a function of ($\rho$) along the height to achieve the desired morph:

$$\rho(h) = \rho_o + \Delta\rho * \left(1 - \left(\frac{2}{h_o}\right)^2 * \left(h - \frac{h_o}{2}\right)^2\right) \tag{3}$$

However, in other embodiments and based on different profile descriptions, the equation used to describe the profile may be different.

Substituting equation 2 into equation 3 results in:

$$\rho(h) = \rho_o + \Delta\rho * \left(\frac{4*(m-1)}{m^2}\right) \tag{4}$$

The positive or negative sign of the change of radius ($\Delta\rho$) can be important as it determines the resulting morph shape; a negative sign produces a hyperbolic profile, whereas a positive sign produces a spherical profile. A model possibility check (MPC) was incorporated into the algorithm to check if the desired morph would be possible considering (s), (m), ($\Delta\rho$) and the restriction of the polygons' sides and the vertical elements being a rigid link.

$$l_s \geq \Delta\rho * \left(\frac{4*(m-1)}{m^2}\right) \text{ if False, then:} \tag{5}$$

Decrease (s) or/and Decrease ($\Delta\rho$) or/and Increase (m)

Because the sub-grid is chosen to be square, the initial height of each segment is equal to the side length ($l_s$) and this MPC in equation 5 insures that if the vertical rigid elements would lie horizontally after morphing the space-frame does not change in length due to the large value of ($\Delta\rho$) of that slice (m). Decreasing (s) will increase the value of ($l_s$) to maintain the initial radius of the circumscribed circle ($\rho_o$), decreasing ($\Delta\rho$) will decrease the change in radius at each slice insuring the vertical elements remains rigid even if they would lie horizontally. Finally, increasing the number of slice (m) will decrease the ($\Delta\rho$) at each slice insuring vertical links remains rigid.

C. Morphing Strategies

The strategy followed in designing the specific SMSFs were done from the geometrical aspect of the design as one of the novel uses of the linear bistable elements LBCCSM is illustrated herein. Placing those LBCCSMs determined the resulting shape of the space-frame, choosing the appropriate element configuration within the sub-grade square tessellation is carried out in reference to FIG. 4 and Table 1. Navigation through this figure and table would require some initial design inputs, and the inputs considered are:

1—The two ends of the space-frame are considered fixed shape; thus its links are rigid.
2—The vertical elements are considered rigid as a mean for load transmission and structural support, thus all diagonal elements need to be LBCCSMs.
3—Symmetrical geometry across the plane of mid height, thus an even number of slice (m).
4—Within the square elements, the diagonal and side LBCCSM elements should move independently from each other.
5—The ability of the sub-grid square to be able to morph to both trapezoid and parallelogram shapes.
6—The end slices are arrayable horizontally only.
7—The intermediate slices are arrayable both vertically and horizontally.
8—If more than one arrangement is found, the arrangement that has the higher number of shapes formed is considered because it possesses more DOF.

Referring to Table 1 and FIG. 4 along with the initial design input, the end slices are chosen to be C3 from $$\binom{5}{n}$$

where only one side and the diagonal are LBCCSM. On the other hand, the choice of D2 from $$\binom{5}{n}$$

best fits me inputs where two opposite side and the diagonal are LBCCSM and its ability to have joint side with the end slices. As shown in FIG. 1, the LBCCSM have two stable positions (normally open and normally closed) with a delta change in length, and depending on the initial state of its stable position and location. Four different design configurations can be produced out of the LBCCSMs' two initial stable positions and their two locations (diagonal or radial element). The characterization of each design was based on element location within the sub-grid square, its initial bistable state, directionality after loading, Poisson effect and morphed shape as shown in Table 2a-d.

TABLE 2A

Example configuration design of LBCCSM placement within a square sub-grid. Configuration Design 1

| Element Location and State | | SMSF's Directionality |
|---|---|---|
| Name | Symbol | after loading |
| Diagonal element initially open ($\delta$eio) | 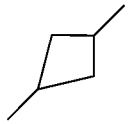 | Shorter |
| Radial element initially open ($\rho$eio) |  | Necked |

Poisson Effect: Negative (−v)
Morphed shape fits Hyperbolic profile

TABLE 2B

Example configuration design of LBCCSM placement within a square sub-grid. Configuration Design 2

| Element Location and State | | SMSF's Directionality |
|---|---|---|
| Name | Symbol | after loading |
| Diagonal element initially closed ($\delta$eic) |  | Longer |
| Radial element initially open ($\rho$eio) | 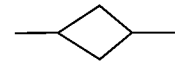 | Necked |

Poisson Effect: Positive (+v)
Morphed shape fits Hyperbolic profile

TABLE 2C

Example configuration design of LBCCSM placement within a square sub-grid. Configuration Design 3

| Element Location and State | | SMSF's Directionality |
|---|---|---|
| Name | Symbol | after loading |
| Diagonal element initially open ($\delta$eio) | 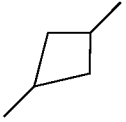 | Shorter |
| Radial element initially closed ($\rho$eic) |  | Bulging |

Poisson Effect: Positive (+v)
Morphed shape fits Spherical profile

TABLE 2D

Example configuration design of LBCCSM
placement within a square sub-grid.
Configuration Design 4

| Element Location and State | | SMSF's Directionality |
|---|---|---|
| Name | Symbol | after loading |
| Diagonal element initially closed (δeic) |  | Longer |
| Radial element initially closed (ρeic) |  | Bulging |

Poisson Effect: Negative (−ν)
Design best fits Spherical profile

FIG. 5C illustrates the type of applied loads for each design to morph the space-frame from its initial shape to its resulting shape; those loads can be applied simultaneously or individually depending on the application. The LBCCSM elements are represented as well showing the bistability transformation between the two states of the space-frame. The following section will demonstrate two design examples showing the results from the mathematical model and the actual prototype.

DESIGN EXAMPLES

Two design examples were chosen to show an application of this an embodiment of the current invention—one having a hyperbolic space-frame and the other having a spherical space-frame. Because there are two designs of each space-frame, the hyperbolic example was taken with a negative Poisson effect, and the spherical example addresses the positive Poisson effect. Initial design parameters were chosen for both examples so as to be similar with minor differences, as follows:
  Number of sides of the polygon (s)=10
  Number of slices (m)=4
  Initial cylinder diameter ($\rho_o$)=300 mm
  The change in space-frame diameter at mid height:
    ($\Delta\rho$)=−140 mm for the hyperbolic space-frame, and
    ($\Delta\rho$)=+140 mm for the spherical space-frame.
  The change in angle between the end plans (JO)=80°
    Clockwise for the hyperbolic space-frame, and
    Counter clockwise for the spherical space-frame.
However, in other embodiments and based on different design requirements, these parameters can change and thus is contemplated to be non-limiting of the scope of the current invention.

To fabricate these example embodiments, the LBCCSM elements were laser cut from a ⅛-inch thick polypropylene co-polymer material, and the rigid links were laser cut from a ⅛-inch thick acrylic sheet. However, in other embodiments and based on different designs, different types of material and different thicknesses can be used to fabricate and construct the design. Each LBCCSM is secured with a pin and guide type slider across its length to prevent the out of plane deformation. The added guiders do not affect the links' bistability, nor do they translate any force. Individual elements are then connected together using fasteners and H-shape joints (see FIG. 6) to give the space-frame as many degrees of freedom as a spherical joint. The joints are formed of polypropylene material laser cut from a ¹⁄₁₆-inch thick sheet and are flexible so that each end can bend and twist independently as shown in FIG. 6. However, in other embodiments and based on different designs, different types of material and different thicknesses can be used to fabricate and construct the design. Because the design is symmetrical across the mid-plane, the number of different LBCCSM required is reduced by half. Each end of the cylindrical space-frame is secured by a decagon plate connected by a low friction shaft to insure that the two planes remain parallel.

A. Example 1: Hyperbolic-Shell Morphing

The hyperbolic SMSF was chosen to be modeled using the design from Table 2A. The diagonal and radial elements are LBCCSM, and the vertical elements are rigid links. Because the desired applied torque is in the clockwise direction, the LBCCSM elements were placed along the diagonal line that shears the square sub-grid the most in order for the actuation to take place. FIGS. 7A and 7B show the results of the mathematical algorithm from MATLAB; the calculated change in length of each element is then tabulated and used to design the LBCCSM.

FIG. 8A shows the constructed single-layer grid in its two dimensional form showing the sub-grid arraying pattern. The grid is then bent into the space-frame's initial cylindrical shape as shown in FIG. 8B. The torque was applied first to deform the diagonal elements as shown in FIG. 8C, followed by radial force to deform the radial element forming the hyperbolic SMSF as shown in FIG. 8D.

B. Example 2: Spherical-Shell Morphing

The spherical SMSF was chosen to be modeled using the design from Table 2C. The diagonal and radial elements are LBCCSM, and the vertical elements are rigid links. Because the desired applied torque is in the counterclockwise direction, the LBCCSM elements were placed along the diagonal line that shears the square sub-grid the most in order for the actuation to take place. The same procedure as the previous example was followed here. FIGS. 9A and 9B show the results of the mathematical algorithm from MATLAB; the calculated change in length of each element is then tabulated and used to design the LBCCSM.

FIG. 10A shows the constructed single-layer grid in its two dimensional form showing the sub-grid arraying pattern. The grid is then bent into the space-frame's initial cylindrical shape as shown in FIG. 10B. The torque load was applied first to deform the diagonal elements as shown in FIG. 10C, followed by the axial force to deform the radial element forming the spherical SMSF as shown in FIG. 10D.

Results and Discussion

The results between the mathematical model and the fabricated apparatus is discussed herein from a geometrical point of view. The results were expected to be different between both methods; the mathematical model takes into account that links are lines and connected to each other by a vertex and act as a spherical joint. Where the prototype is constructed using H-shaped joints, the joints believed to be the source of most of the error were not optimized or included in the mathematical model. Moreover, the prototype gains extra height due to the H-joints, along with its effect on the change in radii; thus the comparison between the two methods of each example is performed using the percentage error of the relative change between the geometrical values of the SMSF, as shown in Table 3.

TABLE 3

Results comparison between the Mathematical model and the prototype measurements. (Dimensions are in millimeter)

| Geometrical Measurements | $h_o$ | $h_f$ | $h_f/h_o$ | $\rho_o$ | $\rho_f$ | $\rho_f/\rho_o$ | $\rho_f - \rho_o$ |
|---|---|---|---|---|---|---|---|
| Hyperbolic SMSF | | | | | | | |
| Matlab | 370.82 | 299.09 | 0.81 | 150 | 80 | 0.53 | −70 |
| Prototype | 445 | 380 | 0.85 | 185 | 120 | 0.65 | −65 |
| % error | | | 5.55 | | | 17.78 | |
| Spherical SMSF | | | | | | | |
| Matlab | 370.82 | 201.23 | 0.54 | 150 | 220 | 1.47 | 70 |
| Prototype | 455 | 300 | 0.66 | 185 | 250 | 1.35 | 65 |
| % error | | | 17.70 | | | 8.53 | |

It is contemplated herein that in addition to the use of a single-layer grid, as has been discussed herein, double-layer grid designs are also possible to introduce a thickness to the space-frame. Also, for morphing of complicated and non-axisymmetric surfaces, stress trajectories can be utilized in placing the bistable elements to be actuated by the applied loads. Finally, SSSs [Lusk, C. and Montalbano, P., 2011, "Design Concepts for Shape-Shifting Surfaces" in Proceedings of the 2011 Design Engineering Technical Conferences & Computers and Information in Engineering Conference, Washington, D.C., Aug. 29-31, 2011. DETC2011-47402] can be modified and used as added attachments to the space-frame to give the space-frame a desired or chosen surface profile.

Glossary of Claim Terms

Bistable elements: This term is used herein to refer to a part of a device that can be in two possible positions.

Bulging: This term is used herein to refer to a unit cell or shape that is stuck out in a rounded way.

Hyperbolic: This term is used herein to refer to a curve formed by the intersection of a double right circular cone with a plane that cuts both halves of the cone.

Necked: This term is used herein to refer to a unit cell or shape that is slender.

Shape-morphing space frame apparatus: This term is used herein to refer to a three-dimensional structural framework which can morph between at least two distinct shapes.

Spherical: This term is used herein to refer to a curve having the general shape of a sphere.

Tessellation: This term is used herein to refer to a covering of a geometric plane without gaps or overlaps by one type of congruent plane figure.

Unit Cell: This term is used herein to refer to an object from which the entire shape-morphing space frame apparatus can be built by repetition of placement of these objects in three dimensions.

All referenced publications are incorporated herein by reference in their entirety. Furthermore, where a definition or use of a term in a reference, which is incorporated by reference herein, is inconsistent or contrary to the definition of that term provided herein, the definition of that term provided herein applies and the definition of that term in the reference does not apply.

The advantages set forth above, and those made apparent from the foregoing description, are efficiently attained. Since certain changes may be made in the above construction without departing from the scope of the invention, it is intended that all matters contained in the foregoing description or shown in the accompanying drawings shall be interpreted as illustrative and not in a limiting sense.

It is also to be understood that the following claims are intended to cover all of the generic and specific features of the invention herein described, and all statements of the scope of the invention that, as a matter of language, might be said to fall therebetween.

What is claimed is:

1. A method of producing predictable and controllable length or shape changes in a space frame, allowing morphing from an initial stable shape into a resulting stable shape that is different from the initial shape, without the use of a hard stop, the method comprising:
   identifying the initial shape and identifying the resulting shape, each shape having a first end and a second end;
   providing at least one polygon formed of unit cells and rigid links, the unit cells and rigid links interconnecting in a tessellation pattern to form the initial shape, the tessellation pattern further including a top and a bottom formed of the rigid links,
   wherein each unit cell has bistability, such that a first stable position is the initial shape and a second stable position is the resulting shape, wherein the each unit cell does not include the hard stop to achieve the bistability;
   selecting the number and location of the unit cells in each of the polygons;
   determining an initial radius or length of the initial shape;
   determining a change in the radius or length at a midpoint of the resulting shape;
   determining the relative motion of the first end and the second end of the initial shape; and
   fabricating and configuring the space frame in the initial position based on the foregoing steps, whereby the space frame in the initial position can morph into the resulting position by a force being exerted onto the space frame,
   wherein each of the unit cells is in an open position or a closed position corresponding to the initial position or the resulting position of the space frame,
   wherein the unit cell becomes shorter when morphing from the open position to the closed position when the unit cell is placed in a diagonal direction of the polygon.

2. The method of claim 1, wherein the unit cell becomes bulging when morphing from the closed position to the open position when the unit cell is placed in a radial direction of the polygon.

3. The method of claim 1, wherein the unit cell becomes longer when morphing from the closed position to the open position when the unit cell is placed in a diagonal direction of the polygon.

4. The method of claim 3, wherein the unit cell becomes necked when morphing from the open position to the closed position when the unit cell is placed in a radial direction of the polygon.

5. The method of claim 1, wherein
   the each polygon includes five elements including the unit cells and the rigid links,
   the each polygon is formed of four sides and one diagonal,
   the four sides include two vertical elements and two horizontal elements.

6. The method of claim 5, further comprising selecting an initial height of the initial shape, and dividing the initial height of the initial shape into a number of slices, the height of the slices being equal to the length of the horizontal elements, the vertical elements being rigid links.

7. The method of claim 1, further comprising defining a maximum actuation force needed for transition between the initial shape and the resulting shape.

8. The method of claim 5, wherein each diagonal element is a unit cell, each radial element is a unit cell, and each vertical element is a rigid link.

9. The method of claim 8, wherein the initial stable shape is a cylindrical shell and the resulting stable shape is a hyperbolic shell, such that in the initial stable shape, the each diagonal unit cell is in the open stable position and the each radial unit cell is in the open stable position, and in the resulting stable shape, the each diagonal unit cell is in the closed stable position and the each radial unit cell is in the closed stable position.

10. The method of claim 8, wherein the initial stable shape is a cylindrical shell and the resulting stable shape is a spherical shell, such that in the initial stable shape, the each diagonal unit cell is in the open stable position and the each radial unit cell is in the closed stable position, and in the resulting stable shape, the each diagonal unit cell is in the closed stable position and the each radial unit cell is in the open stable position.

11. The method of claim 5, wherein the tessellation pattern is formed of square or polygon sub-grids.

12. The method of claim 11, wherein the square or polygon sub-grids are formed of the plurality of unit cells and rigid links.

\* \* \* \* \*